US012709343B2

(12) United States Patent
Kamon et al.

(10) Patent No.: US 12,709,343 B2
(45) Date of Patent: Aug. 18, 2026

(54) QUADRUPEDAL WALKING ROBOT

(71) Applicant: KAWASAKI JUKOGYO KABUSHIKI KAISHA, Kobe (JP)

(72) Inventors: Masayuki Kamon, Kobe (JP); Tatsuhiko Kato, Kobe (JP); So Yukizaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 88 days.

(21) Appl. No.: 18/835,537

(22) PCT Filed: Jan. 26, 2023

(86) PCT No.: PCT/JP2023/002493
§ 371 (c)(1),
(2) Date: Aug. 2, 2024

(87) PCT Pub. No.: WO2023/149354
PCT Pub. Date: Aug. 10, 2023

(65) Prior Publication Data

US 2025/0145234 A1 May 8, 2025

(30) Foreign Application Priority Data

Feb. 2, 2022 (JP) ................................ 2022-014818

(51) Int. Cl.
*B62D 57/032* (2006.01)
*B25J 9/00* (2006.01)
(Continued)

(52) U.S. Cl.
CPC .......... *B62D 57/032* (2013.01); *B25J 9/0009* (2013.01); *B25J 9/1697* (2013.01); *B25J 17/00* (2013.01)

(58) Field of Classification Search
CPC .... B62D 57/032; B62D 57/028; B25J 9/0009; B25J 9/1697; B25J 17/00; B25J 11/00;
(Continued)

(56) References Cited

U.S. PATENT DOCUMENTS

2018/0272238 A1* 9/2018 Cyr ........................ A63H 17/38
2022/0016773 A1* 1/2022 Tsuzaki .................. B25J 19/021
2022/0057800 A1* 2/2022 Perkins .................. B25J 9/1664

FOREIGN PATENT DOCUMENTS

JP S62-061485 U 4/1987
JP H09-132119 A 5/1997
(Continued)

OTHER PUBLICATIONS

Steering of an Underactuated Legged Robot through Terrain Contact with an Active tail (Year: 2018).*
(Continued)

*Primary Examiner* — Abby Lin
*Assistant Examiner* — Renee LaRose
(74) *Attorney, Agent, or Firm* — Oliff PLC

(57) ABSTRACT

A quadrupedal walking robot includes: a main body including a seat portion on which a person is to sit astride; a handle to be gripped by the person seated on the seat portion; four leg portions coupled to the main body and configured to perform a bending operation, each of the four leg portions including two or more joints; a plurality of actuators configured to drive the plurality of joints; an operation device disposed on the handle and configured to receive an input of a command related to an operation of the quadrupedal walking robot; and a controller configured to control the plurality of actuators in accordance with the command received from the operation device.

21 Claims, 13 Drawing Sheets

(51) Int. Cl.
*B25J 9/16* (2006.01)
*B25J 17/00* (2006.01)

(58) Field of Classification Search
CPC ... B25J 5/00; B25J 13/00; B25J 13/006; B25J 13/08; B25J 19/023; G05D 2105/24; G05D 2109/12; G05D 1/223; G05D 1/435; G05D 1/495; G05D 1/81
See application file for complete search history.

(56) References Cited

FOREIGN PATENT DOCUMENTS

| | | | |
|---|---|---|---|
| JP | 2001-260057 | A | 9/2001 |
| JP | 2005-131756 | A | 5/2005 |
| JP | 2007-175831 | A | 7/2007 |
| JP | 2008-137120 | A | 6/2008 |
| JP | 4482677 | B2 | 6/2010 |
| JP | 4724845 | B2 | 7/2011 |

OTHER PUBLICATIONS

Mar. 7, 2023 International Search Report issued in International Patent Application No. PCT/JP2023/002493.

Mar. 7, 2023 Written Opinion of the International Searching Authority issued in International Patent Application No. PCT/JP2023/002493.

* cited by examiner

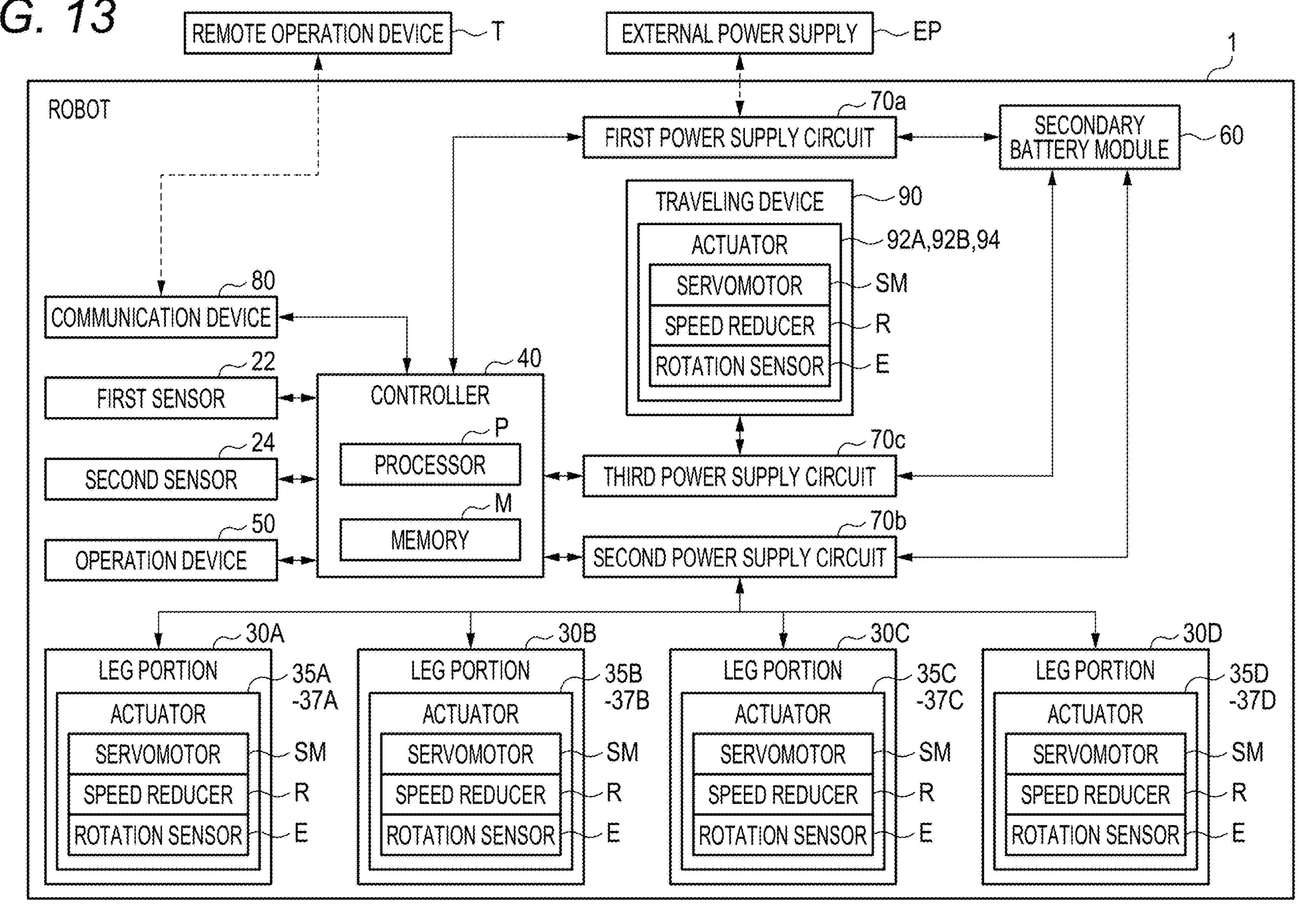
FIG. 13
REMOTE OPERATION DEVICE
T
EXTERNAL POWER SUPPLY
EP
1
ROBOT
FIRST POWER SUPPLY CIRCUIT
70a
SECONDARY BATTERY MODULE
60
TRAVELING DEVICE
90
ACTUATOR
92A,92B,94
SERVOMOTOR
SM
SPEED REDUCER
R
ROTATION SENSOR
E
COMMUNICATION DEVICE
80
FIRST SENSOR
22
CONTROLLER
40
PROCESSOR
P
MEMORY
M
SECOND SENSOR
24
OPERATION DEVICE
50
THIRD POWER SUPPLY CIRCUIT
70c
SECOND POWER SUPPLY CIRCUIT
70b
LEG PORTION
30A
35A
-37A
LEG PORTION
30B
35B
-37B
LEG PORTION
30C
35C
-37C
LEG PORTION
30D
35D
-37D

QUADRUPEDAL WALKING ROBOT

CROSS-REFERENCE TO RELATED APPLICATIONS

The present application is intended to claim the priority and the profit of JP2022-14818, which has been filed to the Japanese patent office on Feb. 2, 2022, and is cited as a part of the present application by referring to the entire application.

TECHNICAL FIELD

The present disclosure relates to a quadrupedal walking robot.

BACKGROUND ART

For example, Japanese Patent No. 4482677 and Japanese Patent No. 4724845 disclose robots having rough terrain mobility. Each of the robots includes a pair of wheels disposed on both sides of a body, four legs disposed on front and back ends of the body, and a seat disposed on the body. The wheels and the legs are driven by a DC servomotor. Further, the robot disclosed in Japanese Patent No. 4724845 includes an auxiliary wheel for each leg. In Japanese Patent No. 4482677 and Japanese Patent No. 4724845, each of the robots operates by selecting a mode using only wheels, a mode using only legs, a mode using wheels and legs, or a mode using wheels, legs, and auxiliary wheels.

SUMMARY OF INVENTION

The robots of Japanese Patent No. 4482677 and Japanese Patent No. 4724845 are assumed to be used in industries such as forestry and construction industry, are intended to travel at a high speed, and thus have a large structure suitable for movement with large wheels. The present disclosure provides a compact quadrupedal walking robot that may be used by a user for daily use.

A quadrupedal walking robot according to an aspect of the present disclosure includes a main body including a seat portion on which a person is to sit astride; a handle to be gripped by the person seated on the seat portion; four leg portions coupled to the main body and configured to perform a bending operation, each of the four leg portions including two or more joints; a plurality of actuators configured to drive the plurality of joints; an operation device disposed on the handle and configured to receive an input of a command related to an operation of the quadrupedal walking robot; and a controller configured to control the plurality of actuators in accordance with the command received from the operation device.

BRIEF DESCRIPTION OF DRAWINGS

FIG. 13 is a block diagram illustrating an example of a configuration of a controller of the quadrupedal walking robot according to the embodiment.

DESCRIPTION OF EMBODIMENTS

Figure 1:
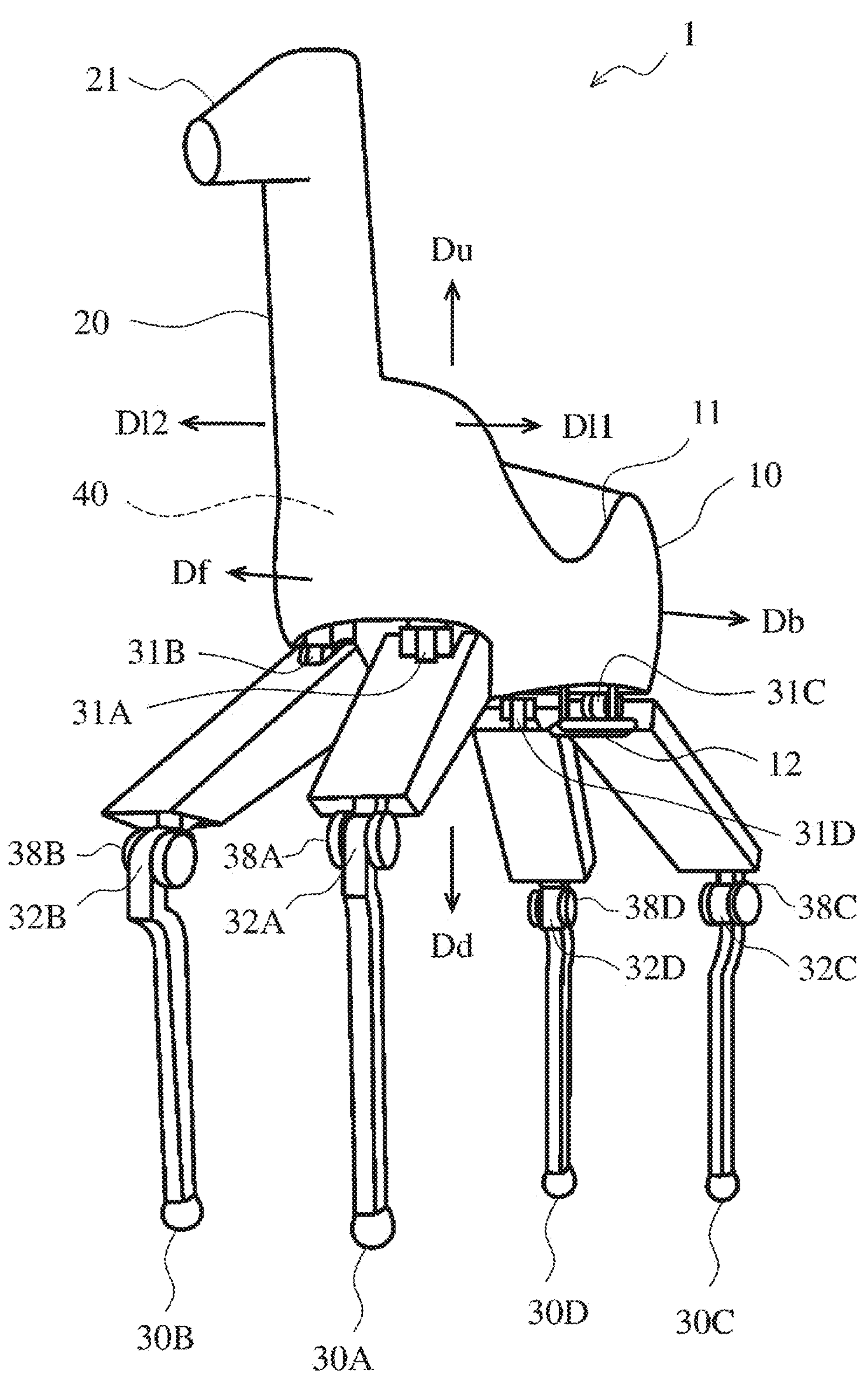
FIG. 1 is a perspective view illustrating an example of a configuration of a quadrupedal walking robot according to an embodiment.

Hereinafter, an exemplary embodiment of the present disclosure will be described with reference to the drawings. The embodiment described below shows a comprehensive or specific example. Among components in the following embodiment, components that are not described in the independent claims indicating the most significant concept will be described as any components. Each drawing in the attached drawings is a schematic drawing and is not necessarily strictly illustrated. In each of the drawings, substantially the same components are denoted by the same reference numerals, and redundant description may be omitted or simplified. In the present description and claims, the "device" may mean not only one device but also a system including a plurality of devices.

A configuration of a quadrupedal walking robot 1 according to the embodiment will be described with reference to FIG. 1. FIG. 1 is a perspective view illustrating an example of a configuration of the quadrupedal walking robot 1 according to the embodiment. In the following description, the "quadrupedal walking robot" is also simply referred to as a "robot". The robot 1 has a structure that performs quadrupedal walking independently or in a state where a person is placed. Although not limited, in the present embodiment, the robot 1 has an appearance imitating a limbs-mammal, and for example, has an appearance imitating a limbs-mammal of a body type that can be ridden by a person, such as a horse, a cow, a deer, a goat, or a sheep. The robot 1 has a structure in which one person rides over the robot 1, but may have a structure in which, for example, two or more persons aligned in front and back directions ride over the robot 1. The robot 1 may have a size equivalent to that of the above limbs-mammal or a motorcycle, and thus may have a compact structure. The robot 1 can function as a small-sized or ultra-small-sized mobility which is an easy-moving means for a person.

The robot 1 includes a body 10, a neck portion 20, four leg portions 30A, 30B, 30C, and 30D, and a controller 40. The controller 40 controls the entire robot 1. The body 10 includes a seat portion 11 on which a person sits astride, at a position in an up direction Du with respect to the body 10.

The body 10 includes footrests 12 on which the person seated on the seat portion 11 places feet, at positions in a down direction Dd with respect to the body 10. The body 10 is an example of a main body.

In the present description and claims, a "front direction Df", a "back direction Db", the "up direction Du", the "down direction Dd", and a "lateral direction Dl" of the body 10 are directions set for the body 10 with reference to the body 10. The front direction Df is a direction facing a forward direction of the robot 1 at the time of quadrupedal walking. The back direction Db is an opposite direction to the front direction Df. The lateral direction Dl includes a first lateral direction Dl1 and a second lateral direction Dl2. The first lateral direction Dl1 and the second lateral direction Dl2 are opposite directions, and are directions intersecting the front direction Df and the back direction Db, for example, directions perpendicular thereto. The up direction Du and the down direction Dd are opposite directions, and are directions intersecting the front direction Df, the back direction Db, the first lateral direction Dl1, and the second lateral direction Dl2, for example, directions perpendicular thereto. The up direction Du is a direction facing an up direction of the robot 1 at the time of quadrupedal walking.

Figure 2:
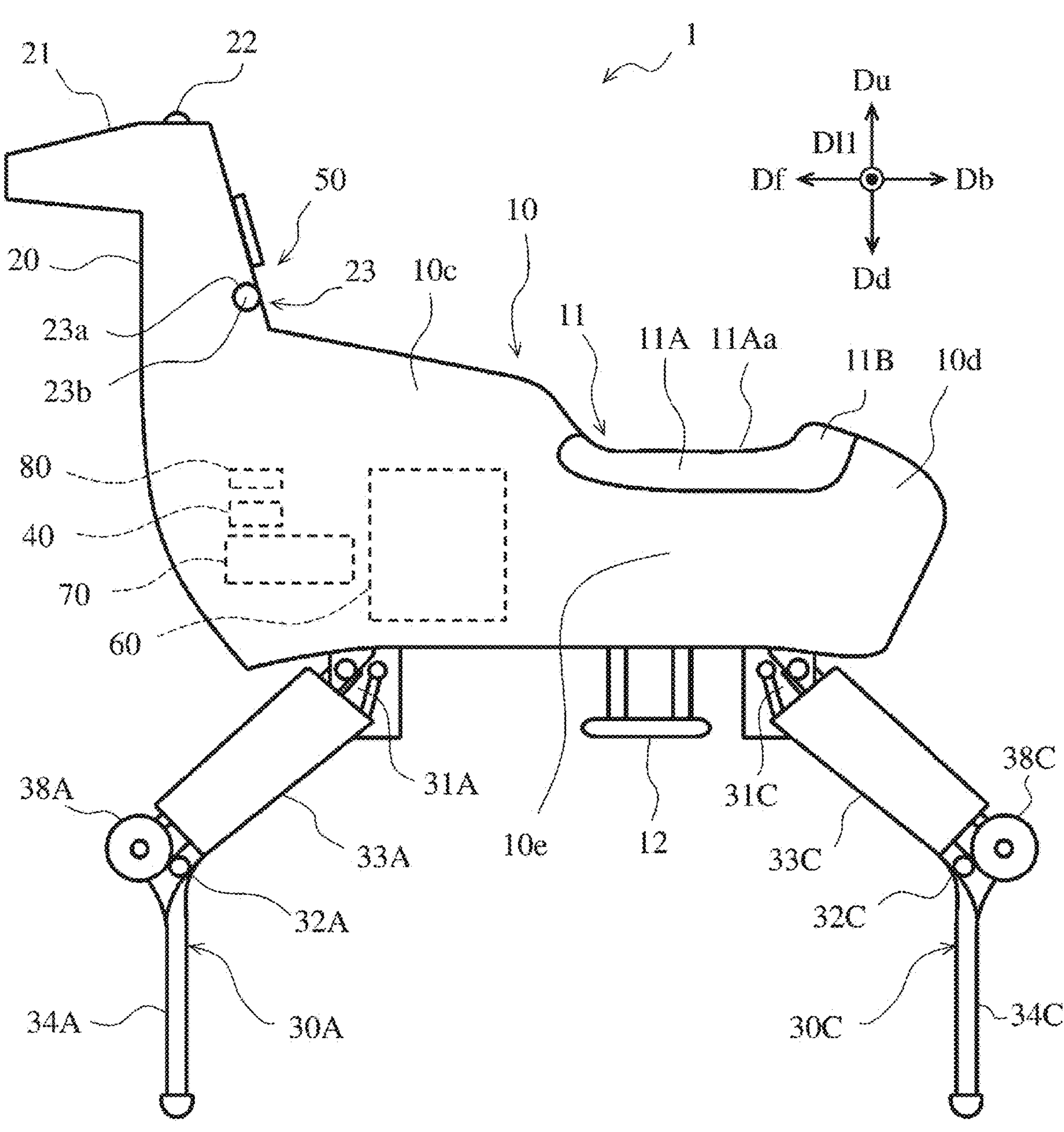
FIG. 2 is a side view of the quadrupedal walking robot in FIG. 1.

FIG. 2 is a side view of the quadrupedal walking robot 1 in FIG. 1. As illustrated in FIG. 2, the seat portion 11 includes a seat 11A extending in the back direction Db from the front direction Df, and a first portion 11B. For example, the seat 11A may have a structure such as a saddle for horse riding or a seat of a motorcycle having cushioning properties. Although not limited, in the present embodiment, the seat 11A includes a seat surface 11Aa having a size that allows one person to sit astride. The seat surface 11Aa may have a size that allows two or more persons to sit astride. The first portion 11B is disposed at a position in the back direction Db with respect to the seat surface 11Aa and is higher than the seat surface 11Aa in the up direction Du. The first portion 11B has a structure having cushioning properties, and may be, for example, a seat back. The first portion 11B may be integrated with the seat 11A.

The two footrests 12 are disposed in the lateral directions Dl1 and Dl2 with respect to the body 10. Although not limited, in the present embodiment, the two footrests 12 are disposed in a state of hanging down from the body 10. The footrest 12 has a structure like a stirrup for horse riding, and may be movably suspended from the body 10 or may be immovably fixed to the body 10. Alternatively, the two footrests 12 may have a structure like a footrest of a motorcycle, protrude from the body 10 in the lateral directions Dl1 and Dl2, and be immovably fixed to the body 10.

The neck portion 20 has a columnar shape and extends in the up direction Du from the body 10 at a position in the front direction Df with respect to the seat portion 11. The neck portion 20 is immovably fixed to the body 10 or integrated with the body 10.

The neck portion 20 includes a handle 23 to be gripped by the person seated on the seat portion 11. Although not limited, in the present embodiment, the handle 23 protrudes in the lateral directions Dl1 and Dl2 with respect to the neck portion 20. The handle 23 is immovably fixed to the neck portion 20 or the body 10. The handle 23 includes a bar 23*a* to be gripped by the person seated on the seat portion. The bar 23*a* has a linear shape extending in the lateral directions Dl1 and Dl2. The handle 23 includes a handle grip 23*b* at an end of the bar 23*a*. The handle grip 23*b* may be formed of a material having a high frictional coefficient such as rubber and sponge in order to increase a frictional force with a person hand, or may be subjected to surface processing for providing irregularities, grooves, and the like.

One bar 23*a* is disposed in the back direction Db with respect to the neck portion 20, but may penetrate the neck portion 20. The two bars 23*a* may extend from the neck portion 20 in the lateral directions Dl1 and Dl2. The bar 23*a* may be movable with respect to the neck portion 20. For example, the bar 23*a* may be rotatable like a handle bar of a bicycle or a motorcycle. The structure of the handle 23 is not limited to the above, may be any structure as long as it can be gripped by a person hand, and may be, for example, a structure such as an arc-shaped or U-shaped bar extending in the lateral directions Dl1 and Dl2, a control stick of an aircraft, steering, a handrail, or a U-shape handle of an automobile, or a rein for horse riding. In this case, the handle 23 may also be immovable or movable with respect to the neck portion 20.

The robot 1 includes a head portion 21 imitating a head portion of the limbs-mammal at an end portion in the up direction Du of the neck portion 20. The robot 1 includes, on the head portion 21, a sensor 22 that scans a periphery of the robot 1. The sensor 22 outputs a signal indicating a detection result to the controller 40.

Although not limited, in the present embodiment, the sensor 22 includes a camera. An imaging direction of the camera is oriented in the front direction Df. The sensor 22 includes a three-dimensional camera capable of detecting a distance to a capturing object, but May include a camera simply capable of acquiring an image. Examples of the three-dimensional camera include a stereo camera, a time-of-flight-camera (TOF camera), a patterned light projection camera such as a fringe projection camera, and a camera using a light-section method. The sensor 22 is an omnidirectional camera having an omnidirectional field of view or hemispherical 360-degree camera, but may be a camera with a limited field of view, such as a wide-angle camera.

The sensor 22 may be a sensor capable of detecting a distance to an object. The sensor 22 performs detection using a light wave, a laser, magnetism, a radio wave, an electromagnetic wave, an ultrasonic wave or a combination thereof, and may include a photoelectric sensor, a laser sensor, a radio wave sensor, an electromagnetic wave sensor, an ultrasonic sensor, various lidars (LiDAR) or a combination thereof.

Figure 3:
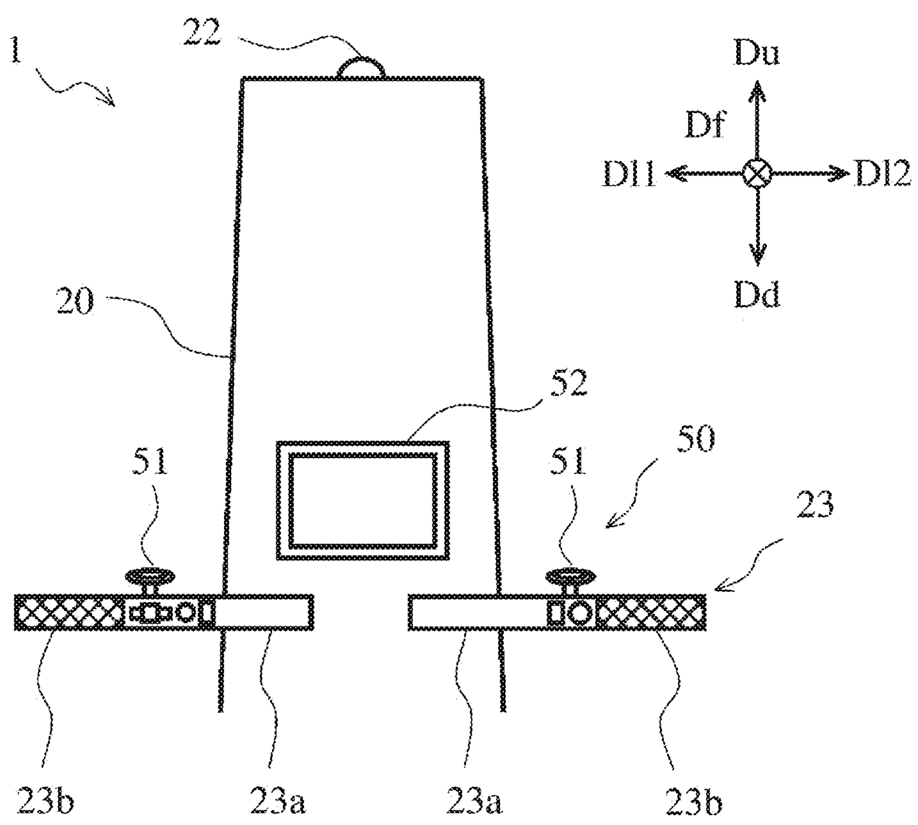
FIG. 3 is a diagram illustrating an example of a configuration of an operation device of the quadrupedal walking robot in FIG. 1.

FIG. 3 is a diagram illustrating an example of a configuration of an operation device 50 of the quadrupedal walking robot 1 in FIG. 1. As illustrated in FIG. 3, the robot 1 includes the operation device 50 disposed on the handle 23. The operation device 50 receives an input of a command related to an operation of the robot 1. Although not limited, in the present embodiment, the operation device 50 includes an input device 51 disposed in the vicinity of each of the two handle grips 23*b* and a display device 52 disposed near a center of the bar 23*a*.

The display device 52 displays various types of information related to the robot 1. The display device 52 may include one or more of a display, display lamps such as an indicator lamp and a warning lamp, and meters such as an analog meter and a digital meter. The display may be a touch panel. In the present embodiment, the display device 52 includes at least a display.

The input device 51 receives various inputs and outputs received input information to the controller 40. The input device 51 receives inputs for various settings of the robot 1, setting of an execution task in an autonomous driving mode, setting of a movement destination, selection of an operation mode, selection of a walking mode, selection of an operation method in a manual driving mode, manual operation in the manual driving mode, selection of a posture of the robot 1 at the time of getting on and off, selection of a posture of the robot 1 at the time of suspension, and the like.

The input device 51 may include one or more of a joystick, a key, a slide switch, a button switch, a lever, and a microphone. The touch panel of the display device 52 may implement a part of functions of the input device 51. In the present embodiment, the input device 51 includes at least a joystick. The joystick receives an input such as selection on the display and manual operation. For example, the joystick may receive an input of a moving direction and a moving speed of the robot 1 in a manual operation.

The handle 23 may implement a part of the functions of the input device 51. When the handle 23 is movable, the input device 51 may include a rotation sensor such as an encoder that detects a rotation amount and a rotation speed of the handle 23. The input device 51 may receive the rotation amount and the rotation speed of the handle 23 as the manual operation or the like. When the handle 23 is immovable, the input device 51 may include a force sensor disposed on the two handle grips 23*b* or in the vicinity thereof. The input device 51 may receive magnitude and a direction of a force detected by the force sensor as the manual operation or the like.

The operation mode includes the autonomous driving mode and the manual driving mode. In the autonomous driving mode, the controller 40 controls the robot 1 to autonomously execute a designated execution task in accordance with a predetermined program. In the manual driving mode, the controller 40 controls the robot 1 to execute an operation in accordance with the manual operation input to the input device 51.

An operation method by manual driving includes a direct operation method using the operation device 50 and a remote operation method using a remote operation device away from the robot 1. The remote operation device performs wireless communication with the robot 1, but may perform wired communication or perform communication via a combination of wired communication and wireless communication. The remote operation device may be an operation device such as a remote controller or an operation terminal. The remote operation device may be a dedicated operation device for the robot 1 or a general-purpose operation device. Examples of the remote operation device may include smart devices such as a personal computer, a workstation, a smartphone, and a tablet, and other electronic devices. The remote operation device is an example of a wireless operation device.

The walking mode includes a quadrupedal walking mode and a wheel traveling mode. In the quadrupedal walking mode, the controller 40 controls the robot 1 to walk with the four leg portions 30A, 30B, 30C, and 30D. In the wheel traveling mode, the controller 40 controls the robot 1 to travel with wheels described later.

The execution task is work to be executed by the robot 1 in the autonomous driving mode, and includes a series of operations of the robot 1. The movement destination is a destination of the movement of the robot 1. For example, the robot 1 may include a navigation system, and the movement destination may be set for the navigation system. The movement destination may be set in either the autonomous driving mode or the manual driving mode.

The posture of the robot 1 at the time of getting on and off may be selected when a person gets on and off the seat portion 11. At this time, for example, the controller 40 may perform control to bend the leg portions 30A, 30B, 30C, and 30D, thereby lowering the body 10 downward. The controller 40 may perform control to change a height position of the body 10 in accordance with the selected posture of the robot 1 at the time of getting on and off.

The posture of the robot 1 at the time of suspension may be selected when the robot 1 is suspended by, for example, turning off a power supply of the robot 1. At this time, the controller 40 may perform control to bend the leg portions 30A, 30B, 30C, and 30D, thereby bringing the wheels of the leg portions 30A, 30B, 30C, and 30D described later into contact with the support surface of the robot 1. Accordingly, the robot 1 is supported by the wheels and may be moved by human power even when the power supply is turned off.

Figure 4:
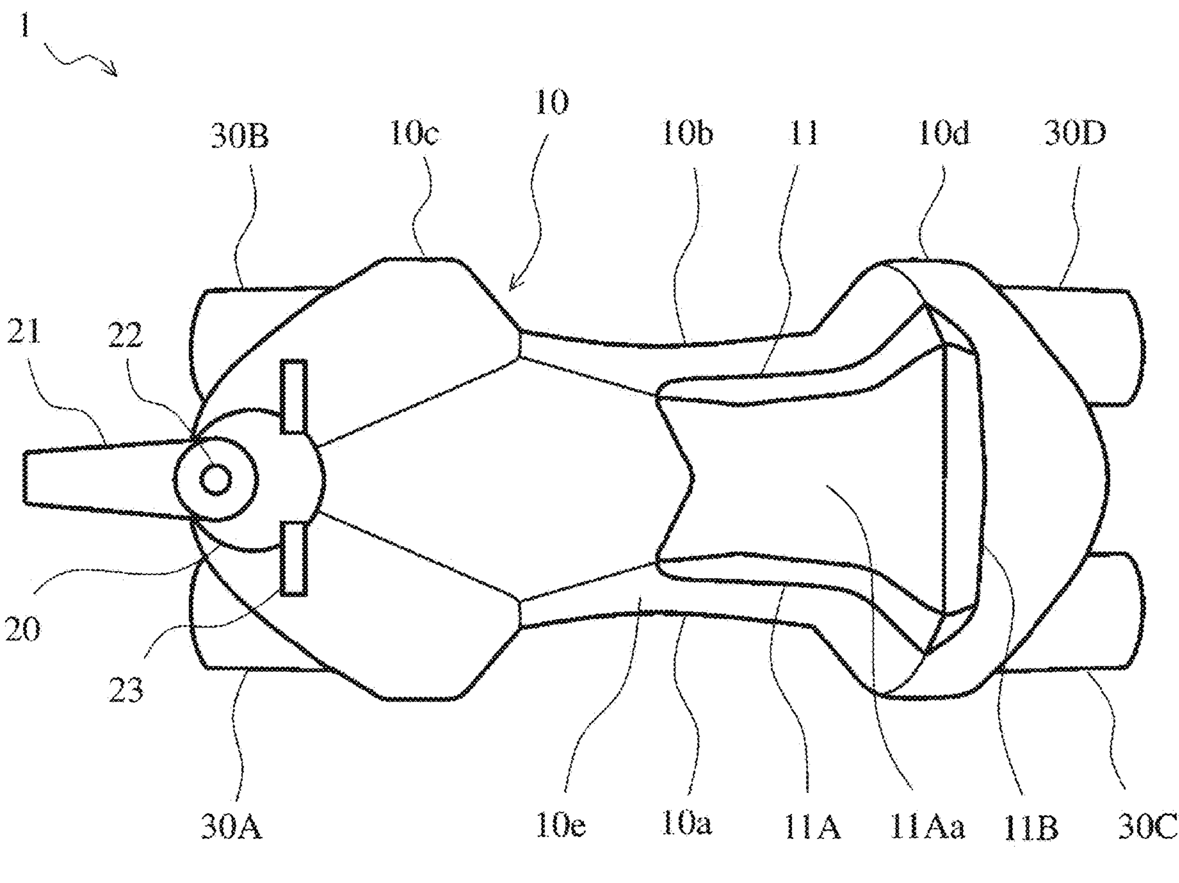
FIG. 4 is a plan view of the quadrupedal walking robot in FIG. 1.
Figure 4:
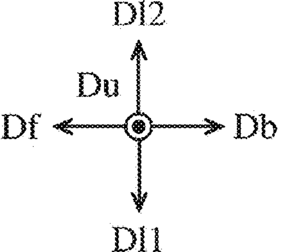

FIG. 4 is a plan view of the quadrupedal walking robot 1 in FIG. 1. As illustrated in FIG. 4, the body 10 includes a first recessed portion 10*a* and a second recessed portion 10*b*. The first recessed portion 10*a* is recessed in a portion of the body 10 that is located on the body 10 in the first lateral direction Dl1 and located on the body 10 in the down direction Dd with respect to the seat portion 11. The second recessed portion 10*b* is recessed in a portion of the body 10 that is located on the body 10 in the second lateral direction Dl2 and located on the body 10 in the down direction Dd with respect to the seat portion 11. The recessed portions 10*a* and 10*b* are recessed to receive legs of the person seated on the seat portion 11. The recessed portions 10*a* and 10*b* face each other in the lateral directions Dl1 and Dl2.

The first recessed portion 10*a* is recessed in the second lateral direction Dl2 with respect to body portions 10*c* and 10*d*. The second recessed portion 10*b* is recessed in the first lateral direction Dl1 with respect to the body portions 10*c* and 10*d*. The first body portion 10*c* is a portion of the body 10 that is located on the body 10 in the front direction Df with respect to the recessed portions 10*a* and 10*b*. The second body portion 10*d* is a portion of the body 10 that is located in the back direction Db on the body 10 with respect to the recessed portions 10*a* and 10*b*. A portion of the body 10 between the recessed portions 10*a* and 10*b* is a third body portion 10*e*. The first body portion 10*c* is an example of a second portion, and the third body portion 10*e* is an example of a third portion.

A width of the third body portion 10*e* in the lateral directions Dl1 and Dl2 may be closer to a width of the seat portion 11 in the lateral directions Dl1 and Dl2 than a width of the first body portion 10*c* in the lateral directions Dl1 and Dl2. A width of the third body portion 10*e* in the lateral directions Dl1 and Dl2 may be closer to a width of the seat portion 11 in the lateral directions Dl1 and Dl2 than a width of the second body portion 10*d* in the lateral directions Dl1 and Dl2. Since the width of the third body portion 10*e* is close to the width of the seat portion 11, the landing property of the feet of the person seated on the seat portion 11 is good. The person seated on the seat portion 11 can easily and reliably sandwich the third body portion 10*e* with his/her legs, and thus can stably ride on the robot 1. The body portions 10*c* and 10*d* which are wider can prevent the person from sliding and moving in the front direction Df and the back direction Db on the seat portion 11, thereby allowing the person to be seated stably.

The first body portion 10*c* protrudes in the first lateral direction Dl1 and the second lateral direction Dl2 with respect to the third body portion 10*e*. The first body portion 10*c* can prevent the legs of the person seated on the seat portion 11 from moving in the up direction Du, thereby allowing the person to be seated stably. The first body portion 10*c* is wide, and thus can accommodate various devices without adversely affecting a sitting posture of the person.

Although not limited, in the present embodiment, the leg portions 30A and 30B are connected to the first body portion 10*c* and may function as front legs of the robot 1. The leg portions 30C and 30D are connected to the second body portion 10*d*, and may function as back legs of the robot 1.

As illustrated in FIG. 2, the robot 1 includes, in the first body portion 10*c*, the controller 40, a secondary battery module 60, a power supply circuit 70, and a communication device 80.

The secondary battery module 60 functions as a power source of the robot 1. The secondary battery module 60 includes one or more secondary batteries. The secondary battery is a battery capable of charging and discharging power. Examples of the secondary battery may include a lead storage battery, a lithium ion secondary battery, an all-solid-state battery, a nickel-hydrogen storage battery, and a nickel-cadmium storage battery.

The power supply circuit 70 is a circuit that controls supply and demand of power to the secondary battery module 60. The power supply circuit 70 performs power control in accordance with a command or the like from the controller 40. For example, the power supply circuit 70 may include devices such as a converter, an inverter, a transformer, and an amplifier.

The power supply circuit 70 is configured to be connected to an external power supply such as a commercial power supply. The power supply circuit 70 receives power supplied from the external power supply, and supplies the power to the secondary battery module 60 to store the power. The power supply circuit 70 controls the power supplied to the secondary battery module 60. The power supply circuit 70 supplies the power stored in the secondary battery module 60 to components that consume power in the robot 1. The power supply circuit 70 controls the power supplied to each component.

The communication device 80 is a device for performing wireless communication with the remote operation device. The communication device 80 may directly or indirectly perform wireless communication with the remote operation device. In indirect wireless communication, the communication device 80 is connected to a communication network via wireless communication and communicates with the remote operation device via the communication network. The wireless communication used by the communication device 80 is not particularly limited.

The communication network is not particularly limited, and may include, for example, a local area network (LAN), a wide area network (WAN), the Internet, or a combination of two or more thereof. The communication network may use near field communication such as Bluetooth (registered trademark) and ZigBee (registered trademark), a network dedicated line, a communication carrier dedicated line, a public switched telephone network (PSTN), a mobile communication network, an Internet network, satellite communication, or a combination of two or more thereof. The mobile communication network may use a fourth-generation mobile communication system, a fifth-generation mobile communication system, or the like. The communication network may include one or a plurality of networks.

Figure 5:
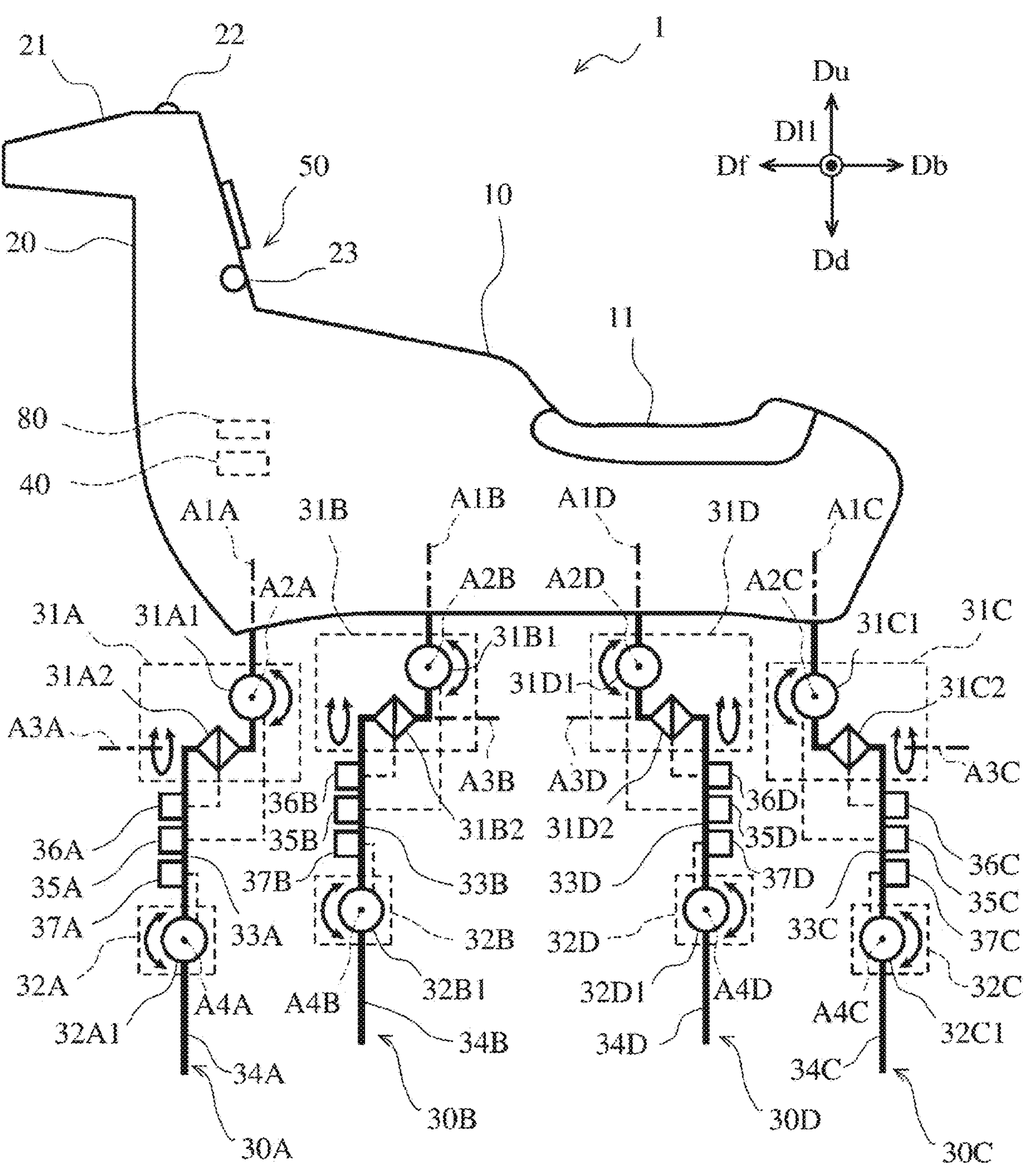
FIG. 5 is a diagram illustrating an example of a configuration of joints of the quadrupedal walking robot according to the embodiment.

FIG. 5 is a diagram illustrating an example of a configuration of the joints of the quadrupedal walking robot 1 according to the embodiment. As illustrated in FIG. 5, each of the leg portions 30A, 30B, 30C, and 30D includes two or more joints. Although not limited, in the present embodiment, the leg portions 30A, 30B, 30C, and 30D respectively include proximal joints 31A, 31B, 31C, and 31D coupled to the body 10, and one or more intermediate joints 32A, 32B, 32C, and 32D disposed between the proximal joints 31A, 31B, 31C, and 31D and tips of the leg portions 30A, 30B, 30C, and 30D. Further, the leg portions 30A, 30B, 30C, and 30D respectively include one or more intermediate links 33A, 33B, 33C, and 33D, and tip links 34A, 34B, 34C, and 34D.

The intermediate links 33A, 33B, 33C, and 33D couple the joints to each other to respectively form a part of skeletons of the leg portions 30A, 30B, 30C, and 30D. The tip links 34A, 34B, 34C, and 34D are coupled to the intermediate joints 32A, 32B, 32C, and 32D, extend to the tips of the leg portions 30A, 30B, 30C, and 30D, and form a part of the skeletons of the leg portions 30A, 30B, 30C, and 30D, respectively. The tips of the tip links 34A, 34B, 34C, and 34D are subjected to a process of increasing the frictional force with the support surface supporting the robot 1. For example, the tip may be attached with a member made of a material having a high frictional coefficient, such as rubber or sponge, or may be subjected to surface processing for forming irregularities, grooves, and the like.

In the present embodiment, the leg portions 30A, 30B, 30C, and 30D include one intermediate joint 32A, 32B, 32C, and 32D, respectively. The leg portions 30A, 30B, 30C, and 30D include one intermediate link 33A, 33B, 33C, and 33D, respectively.

Each of the proximal joints 31A, 31B, 31C, and 31D is operable with two or more degrees of freedom, and each of the intermediate joints 32A, 32B, 32C, and 32D is operable with one or more degrees of freedom. In the present embodiment, each of the proximal joints 31A, 31B, 31C, and 31D is operable with two degrees of freedom, and each of the intermediate joints 32A, 32B, 32C, and 32D is operable with one degree of freedom.

The proximal joints 31A, 31B, 31C, and 31D include first bent portions 31A1, 31B1, 31C1, and 31D1 and second bent portions 31A2, 31B2, 31C2, and 31D2, respectively. Although not limited, in the present embodiment, the first bent portions 31A1, 31B1, 31C1, and 31D1 are coupled to the body 10, and the second bent portions 31A2, 31B2, 31C2, and 31D2 are coupled to the intermediate links 33A, 33B, 33C, and 33D, respectively.

The first bent portions 31A1, 31B1, 31C1, and 31D1 are bent around second axes A2A, A2B, A2C, and A2D, respectively. The second axes A2A, A2B, A2C, and A2D extend in directions intersecting first axes A1A, A1B, A1C, and A1D extending in the up and down directions Du and Dd of the body 10, respectively.

In the present embodiment, the first axes A1A, A1B, A1C, and A1D are not parallel to the up and down directions Du and Dd, but may be parallel thereto. The first axes A1A, A1B, A1C, and A1D are also axes in directions from the proximal joints 31A, 31B, 31C, and 31D toward the body 10, respectively.

In the present embodiment, the second axes A2A, A2B, A2C, and A2D are perpendicular to the first axes A1A, A1B, A1C, and A1D, respectively. Further, the second axes A2A, A2B, A2C, and A2D extend in the lateral directions Dl1 and Dl2. The second axes A2A, A2B, A2C, and A2D are not parallel to the lateral directions Dl1 and Dl2, but may be parallel thereto.

The first bent portions 31A1, 31B1, 31C1, and 31D1 are bent in a pitching direction with respect to the body 10.

The second bent portions 31A2, 31B2, 31C2, and 31D2 are bent about third axes A3A, A3B, A3C, and A3D, respectively. The third axes A3A, A3B, A3C, and A3D extend in directions intersecting the first axes A1A, A1B, A1C, and A1D and intersecting the second axes A2A, A2B, A2C, and A2D, respectively. In the present embodiment, the third axes A3A, A3B, A3C, and A3D are perpendicular to the second axes A2A, A2B, A2C, and A2D, respectively. Further, the third axes A3A, A3B, A3C, and A3D extend in the front and back directions Df and Db in a state where the intermediate links 33A, 33B, 33C, and 33D extend in the down direction Dd.

The second bent portions 31A2, 31B2, 31C2, and 31D2 are bent in a rolling direction with respect to the body 10 when the intermediate links 33A, 33B, 33C, and 33D extend in the down direction Dd.

However, the second bent portions 31A2, 31B2, 31C2, and 31D2 may be coupled to the body 10, and the first bent portions 31A1, 31B1, 31C1, and 31D1 may be coupled to the intermediate links 33A, 33B, 33C, and 33D, respectively. In this case, the third axes A3A, A3B, A3C, and A3D may extend in the front and back directions Df and Db. The second axes A2A, A2B, A2C, and A2D may extend in the lateral directions Dl1 and Dl2 in a state where the intermediate links 33A, 33B, 33C, and 33D extend in the down direction Dd.

The proximal joints 31A, 31B, 31C, and 31D enable the intermediate links 33A, 33B, 33C, and 33D to perform a combination of swinging in the front and back directions Df and Db and swinging in the lateral directions Dl1 and Dl2, respectively.

The intermediate joints 32A, 32B, 32C, and 32D respectively include third bent portions 32A1, 32B1, 32C1, and 32D1 that are bent to change angles formed by links on both sides of the intermediate joints 32A, 32B, 32C, and 32D. In the present embodiment, the third bent portions 32A1, 32B1, 32C1, and 32D1 are bent to change angles formed by the intermediate links 33A, 33B, 33C, and 33D and the tip links 34A, 34B, 34C, and 34D, respectively.

The third bent portions 32A1, 32B1, 32C1, and 32D1 are bent about fourth axes A4A, A4B, A4C, and A4D, respectively. The fourth axes A4A, A4B, A4C, and A4D respectively extend in directions intersecting the directions in which the intermediate links 33A, 33B, 33C, and 33D extend and the directions in which the tip links 34A, 34B, 34C, and 34D extend. The fourth axes A4A, A4B, A4C, and A4D extend in the lateral directions Dl1 and Dl2 in a state where the leg portions 30A, 30B, 30C, and 30D extend in the down direction Dd.

The third bent portions 32A1, 32B1, 32C1, and 32D1 are bent in the pitching direction with respect to the body 10 when the leg portions 30A, 30B, 30C, and 30D extend in the down direction Dd. The intermediate joints 32A, 32B, 32C, and 32D allow the tip links 34A, 34B, 34C, and 34D to swing in the front and back directions Df and Db, respectively.

The robot 1 includes a plurality of actuators that drive the proximal joints 31A, 31B, 31C, and 31D and the intermediate joints 32A, 32B, 32C, and 32D. The plurality of actuators are examples of joint actuators. The plurality of actuators include actuators 35A, 35B, 35C, and 35D that respectively drive the first bent portions 31A1, 31B1, 31C1, and 31D1 to be bent, actuators 36A, 36B, 36C, and 36D that respectively drive the second bent portions 31A2, 31B2, 31C2, and 31D2 to be bent, and actuators 37A, 37B, 37C, and 37D that respectively drive the third bent portions 32A1, 32B1, 32C1, and 32D1 to be bent. The actuators 35A to 35D, 36A to 36D, and 37A to 37D are examples of the joint actuators.

Although not limited, in the present embodiment, each of the actuators 35A to 35D, 36A to 36D, and 37A to 37D includes a servomotor SM, a speed reducer R, and a rotation sensor E such as an encoder. The servomotor SM is controlled by the controller 40, and the rotation sensor E detects a rotation amount of the servomotor SM and outputs a signal indicating a detection result to the controller 40. The speed reducer R transmits a rotational driving force of the servomotor SM to the bent portion while reducing the rotation speed of the servomotor SM and increasing the rotational driving force.

Although not limited, in the present embodiment, the actuators 35A, 36A, and 37A are disposed on the intermediate link 33A, the actuators 35B, 36B, and 37B are disposed on the intermediate link 33B, the actuators 35C, 36C, and 37C are disposed on the intermediate link 33C, and the actuators 35D, 36D, and 37D are disposed on the intermediate link 33D. Accordingly, since the weight of the components of the robot 1 decreases toward the down direction Dd, the controller 40 can easily control the posture balance of the robot 1.

As illustrated in FIGS. 1 and 2, the robot 1 further includes one or more driven wheels 38A, 38B, 38C, and 38D, which are rotatable, at the intermediate joints 32A, 32B, 32C, and 32D, respectively. Although not limited, in the present embodiment, the number of each of the driven wheels 38A, 38B, 38C, and 38D is two. The pairs of the driven wheels 38A, 38B, 38C, and 38D rotate coaxially about the fourth axes A4A, A4B, A4C, and A4D and sandwich the intermediate joints 32A, 32B, 32C, and 32D, respectively. The driven wheels 38A, 38B, 38C, and 38D are examples of a first wheel.

The driven wheels 38A, 38B, 38C, and 38D are disposed at the intermediate joints 32A, 32B, 32C, and 32D, respectively, so as to come into contact with the support surface supporting the robot 1 as the proximal joints 31A, 31B, 31C, and 31D and the intermediate joints 32A, 32B, 32C, and 32D operate, thereby movably supporting the robot 1. For example, when the leg portions 30A, 30B, 30C, and 30D are bent such that the intermediate joints 32A, 32B, 32C, and 32D protrude in the down direction Dd, the driven wheels 38A, 38B, 38C, and 38D may come into contact with the support surface.

Figure 6:
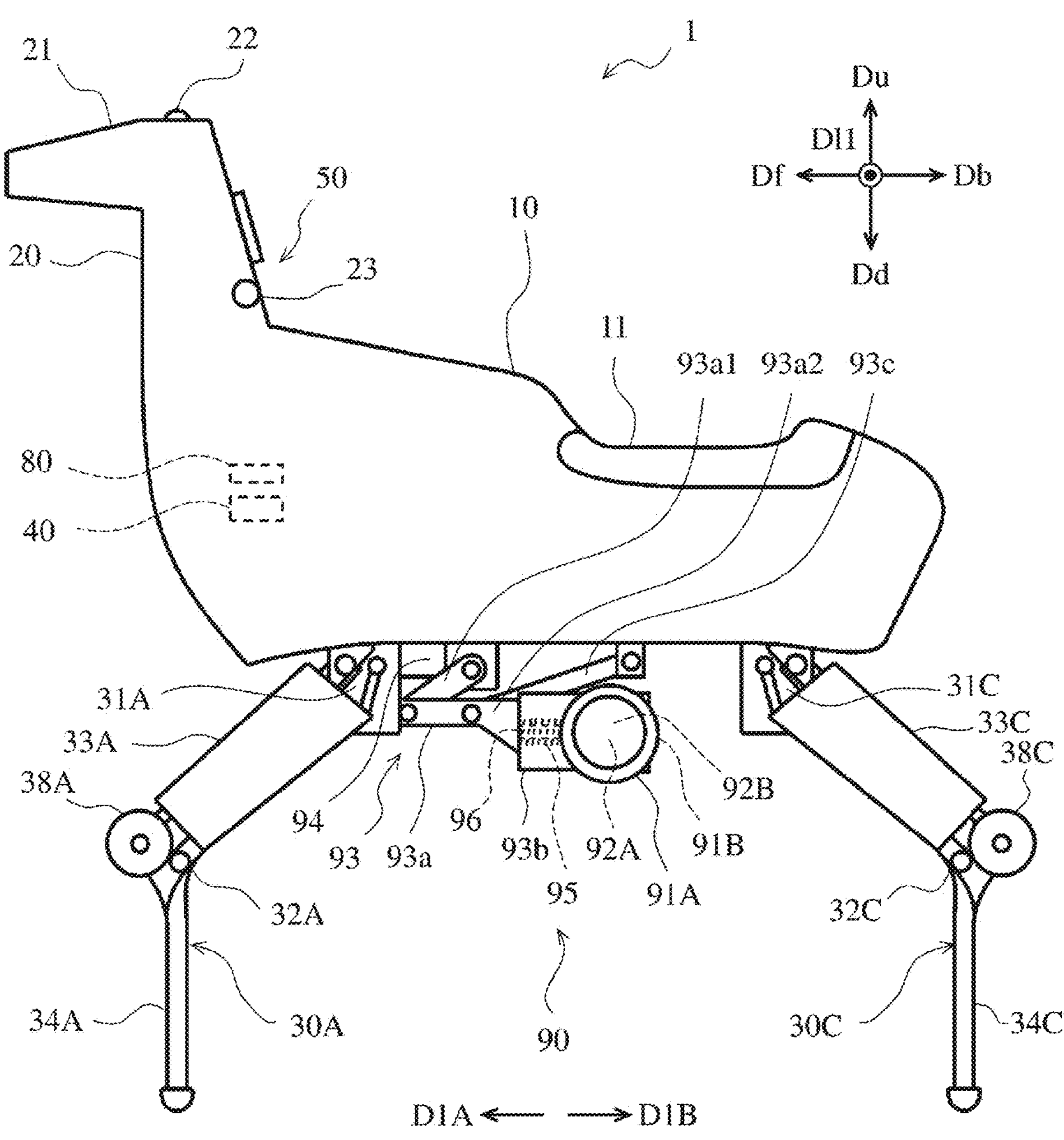
FIG. 6 is a side view illustrating an example of a configuration of the quadrupedal walking robot in FIG. 1 in a quadrupedal walking mode.
Figure 7:
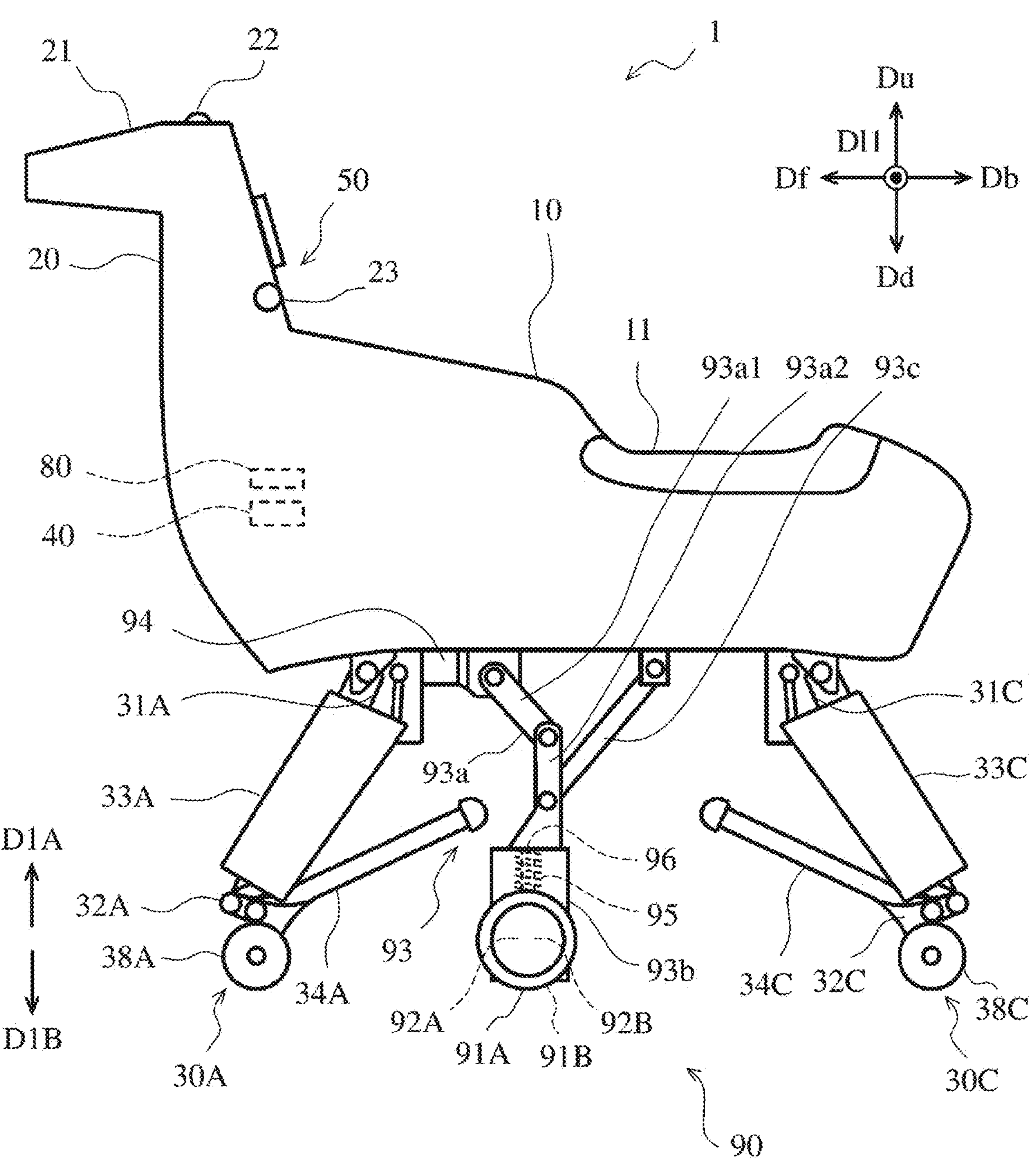
FIG. 7 is a side view illustrating an example of a configuration of the quadrupedal walking robot in FIG. 1 in a wheel traveling mode.

FIG. 6 is a side view illustrating an example of a configuration of the quadrupedal walking robot 1 in FIG. 1 in the quadrupedal walking mode. FIG. 7 is a side view illustrating an example of a configuration of the quadrupedal walking robot 1 in FIG. 1 in the wheel traveling mode. In FIG. 6 and FIG. 7, illustration of the footrest 12 is omitted. As illustrated in FIGS. 6 and 7, the robot 1 further includes a traveling device 90 in the body 10.

The traveling device 90 can be stored in the body 10. Further, the traveling device 90 protrudes from the body 10 in the down direction Dd from a state of being stored in the body 10, may operate to come into contact with the support surface supporting the robot 1, and can move the robot 1 in a state of being in contact with the support surface.

The traveling device 90 includes a traveling wheel 91, a first actuator 92, a support body 93, a second actuator 94, a biasing member 95, and an attenuator 96. The first actuator 92 rotationally drives the traveling wheel 91, and the second actuator 94 operates the support body 93. The first actuator 92 is an example of a traveling actuator, and the second actuator 94 is an example of a support body actuator. Each of the actuators 92 and 94 includes the servomotor SM, the speed reducer R, and the rotation sensor E such as an encoder. The servomotor SM is controlled by the controller

40, and the rotation sensor E outputs a signal indicating a detection result of a rotation amount of the servomotor SM to the controller 40. The speed reducer R transmits a rotational driving force of the servomotor SM to a driving target.

Although not limited, in the present embodiment, the traveling device 90 includes two traveling wheels 91A and 91B as the traveling wheel 91, and includes, as the first actuator 92, first actuators 92A and 92B that respectively drive the traveling wheels 91A and 91B.

The support body 93 is disposed and fixed to the body 10, and supports the traveling wheels 91A and 91B on the body 10. The support body 93 can operate to move the traveling wheels 91A and 91B between a first position where the traveling wheels 91A and 91B protrude from the body 10 in the down direction Dd as illustrated in FIG. 7 and a second position where the traveling wheels 91A and 91B approach the body 10 and are stored in the body 10 as illustrated in FIG. 6.

Although not limited, in the present embodiment, the support body 93 includes an arm 93*a*, a tip member 93*b*, and an auxiliary link 93*c*. The arm 93*a* supports the traveling wheels 91A and 91B via the tip member 93*b* and is bendable. The arm 93*a* includes two links 93*al* and 93*a*2 coupled to each other in a rotatable manner. A proximal end of the link 93*al* at a proximal portion of the arm 93*a* is connected to the body 10 in a rotatable manner, and a tip of the link 93*a*2 at a tip of the arm 93*a* is connected to the tip member 93*b*. The proximal end of the link 93*al* is connected to the second actuator 94. The link 93*al* is rotationally driven around the proximal end by the second actuator 94.

A proximal end of the auxiliary link 93*c* is connected to the body 10 in a rotatable manner. A tip of the auxiliary link 93*c* is connected to the link 93*a*2 in a rotatable manner at a position away from a coupling portion between the links 93*al* and 93*a*2. For example, the tip of the auxiliary link 93*c* may be connected to a connection portion between the tip member 93*b* and the link 93*a*2 or the vicinity thereof. The auxiliary link 93*c* determines a trajectory along which a connection portion between the links 93*a*2 and 93*c* moves as one arc-shaped trajectory. Accordingly, the trajectory of the tip member 93*b* when the link 93*al* rotates is determined to be one. The arm 93*a* bends at the second position as illustrated in FIG. 6 and extends at the first position as illustrated in FIG. 7.

The tip member 93*b* coaxially supports the traveling wheels 91A and 91B in a rotatable manner at an end opposite to the arm 93*a*. Although not limited, in the present embodiment, rotation axes of the traveling wheels 91A and 91B extend in the lateral directions Dl1 and Dl2. The tip member 93*b* supports the first actuators 92A and 92B, the biasing member 95, and the attenuator 96. The first actuators 92A and 92B are connected to the traveling wheels 91A and 91B, respectively. The biasing member 95 and the attenuator 96 are connected to bearings of the traveling wheels 91A and 91B or support members of the bearings. The bearings of the traveling wheels 91A and 91B or the support members of the bearings are movable in a direction D1A from the traveling wheels 91A and 91B toward the arm 93*a* and an opposite direction D1B.

The biasing member 95 biases the traveling wheels 91A and 91B via the bearings of the traveling wheels 91A and 91B or the support members of the bearings. The biasing member 95 biases the traveling wheels 91A and 91B at the first position as illustrated in FIG. 7 in a direction away from the body 10. The biasing member 95 biases the traveling wheels 91A and 91B in a direction from the arm 93*a* toward the tip member 93*b*. For example, the biasing member 95 may have a structure including a spring such as a coil spring, bellows, a gas pressure or liquid pressure cylinder, or a combination thereof.

The attenuator 96 acts on the traveling wheels 91A and 91B via the bearings of the traveling wheels 91A and 91B or the support members of the bearings, and attenuates vibration energy acting on the traveling wheels 91A and 91B. For example, the attenuator 96 may have a structure including a damper containing gas or liquid, rubber, gel, or a combination thereof.

For example, in the quadrupedal walking mode, the controller 40 controls the actuators of the leg portions 30A, 30B, 30C, and 30D so that the tips of the tip links 34A, 34B, 34C, and 34D are brought into contact with the support surface of the robot 1, as illustrated in FIG. 6. Further, the controller 40 controls the second actuator 94 such that the traveling wheels 91A and 91B are stored in the second position. In addition, the controller 40 controls the actuators of the leg portions 30A, 30B, 30C, and 30D so as to cause the leg portions 30A, 30B, 30C, and 30D to perform a walking operation.

In the wheel traveling mode, the controller 40 controls the actuators of the leg portions 30A, 30B, 30C, and 30D such that the driven wheels 38A, 38B, 38C, and 38D of the intermediate joints 32A, 32B, 32C, and 32D are brought into contact with the support surface of the robot 1, respectively, as illustrated in FIG. 7. Further, the controller 40 controls the second actuator 94 such that the traveling wheels 91A and 91B protrude to the first position.

Although not limited, in the present embodiment, the intermediate joints 32A and 32B are located in the down direction Dd with respect to the proximal joints 31A and 31B or in the front direction Df with respect to the proximal joints 31A and 31B. The intermediate joints 32C and 32D are located in the down direction Dd with respect to the proximal joints 31C and 31D or in the back direction Db with respect to the proximal joints 31C and 31D. The tips of the tip links 34A and 34B are located in the back direction Db with respect to the intermediate joints 32A and 32B, respectively, and the tips of the tip links 34C and 34D are located in the front direction Df with respect to the intermediate joints 32C and 32D, respectively. Positions of the tips of the tip links 34A, 34B, 34C, and 34D are not limited to those described above. The intermediate joints 32A and 32B may be located in the back direction Db with respect to the proximal joints 31A and 31B, respectively, and the intermediate joints 32C and 32D may be located in the front direction Df with respect to the proximal joints 31C and 31D, respectively.

The controller 40 controls the first actuators 92A and 92B to drive the traveling wheels 91A and 91B. The controller 40 moves the robot 1 forward or backward by rotationally driving the traveling wheels 91A and 91B in the same rotation direction and at the same rotation speed. The controller 40 turns the robot 1 to the left or to the right by rotationally driving the traveling wheels 91A and 91B in the same rotation direction and at different rotation speeds, or in different rotation directions. The controller 40 may drive the actuators of the proximal joints 31A, 31B, 31C, and 31D to turn the intermediate links 33A, 33B, 33C, and 33D, respectively, thereby turning the robot 1 to the left or the right.

Figure 8:
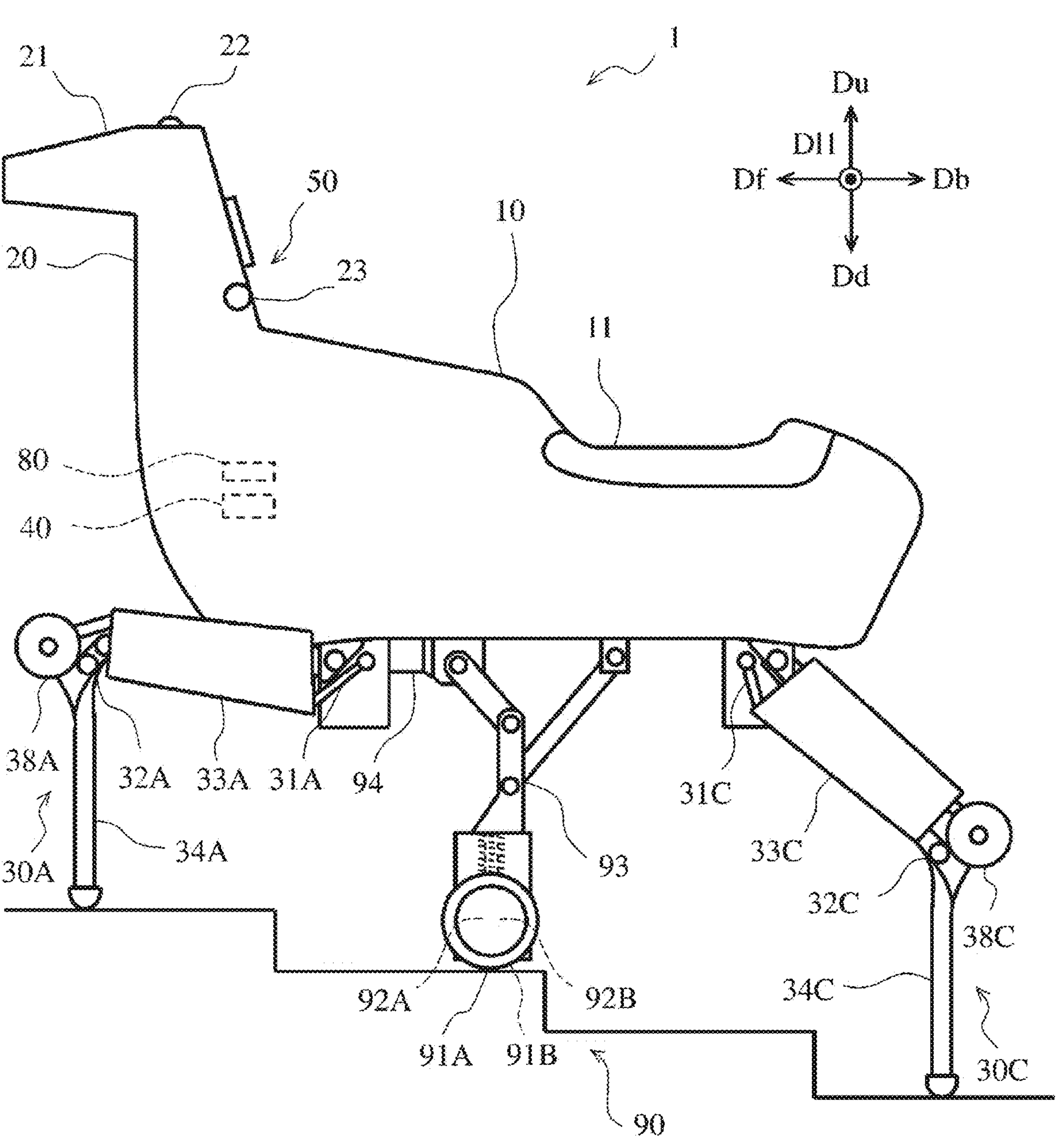
FIG. 8 is a side view illustrating an example in which the quadrupedal walking robot in FIG. 6 moves using a leg portion and a traveling device in combination.

In the quadrupedal walking mode, the controller 40 may control the actuator so as to move the robot 1 using the leg portions 30A, 30B, 30C, and 30D and the traveling device 90 in combination, as illustrated in FIG. 8. FIG. 8 is a side view illustrating an example in which the quadrupedal walking robot 1 in FIG. 6 moves using the leg portions 30A, 30B, 30C, and 30D and the traveling device 90 in combination.

For example, when the robot 1 is in a predetermined state in the quadrupedal walking mode, the controller 40 may control the operations of the actuators 92A, 92B, and 94 of the traveling device 90 so that the traveling device 90 protrudes from the body 10 and presses the support surface of the robot 1, in addition to the operations of the leg portions 30A, 30B, 30C, and 30D. At this time, the support and movement of the robot 1 by the traveling device 90 may be auxiliary to the support and movement of the robot 1 by the leg portions 30A, 30B, 30C, and 30D. The support and movement of the robot 1 by the leg portions 30A, 30B, 30C, and 30D may be auxiliary to the support and movement of the robot 1 by the traveling device 90.

For example, the predetermined state in the quadrupedal walking mode may be one or more of a state where a load applied to the leg portions 30A, 30B, 30C, and 30D exceeds a predetermined load, a state where the posture of the robot 1 is unstable, and the like. For example, the predetermined state may occur when the leg portions 30A, 30B, 30C, and 30D walk on a support surface that is not flat in a horizontal direction, such as a stepped support surface or an inclined support surface.

When the robot 1 is in the predetermined state in the wheel traveling mode, the controller 40 may control the actuator to move the robot 1 by using the leg portions 30A, 30B, 30C, and 30D and the traveling device 90 in combination, as illustrated in FIG. 7. The controller 40 may control the operation of the actuators of the proximal joints 31A, 31B, 31C, and 31D such that the leg portions 30A, 30B, 30C, and 30D press the support surface of the robot 1 with the driven wheels 38A, 38B, 38C, and 38D, in addition to the operation of the traveling device 90. At this time, the support of the robot 1 by the driven wheels 38A, 38B, 38C, and 38D may be auxiliary to the support of the robot 1 by the traveling device 90. The support of the robot 1 by the traveling device 90 may be auxiliary to the support of the robot 1 by the driven wheels 38A, 38B, 38C, and 38D. When the robot 1 is in the predetermined state in the wheel traveling mode, the controller 40 may use the leg portions 30A, 30B, 30C, and 30D and the traveling device 90 in combination, as illustrated in FIG. 8.

For example, the predetermined state in the wheel traveling mode may be one or more of a state where a driving force of the traveling wheels 91A and 91B cannot be sufficiently transmitted to the support surface of the robot 1, a state where the driving force of the traveling wheels 91A and 91B is insufficient for the movement of the robot 1, a state where the posture of the robot 1 is unstable, and the like. For example, the predetermined state may occur when the traveling wheels 91A and 91B move on a support surface that is not flat in the horizontal direction, such as uneven support surface or inclined support surface.

Figure 9:
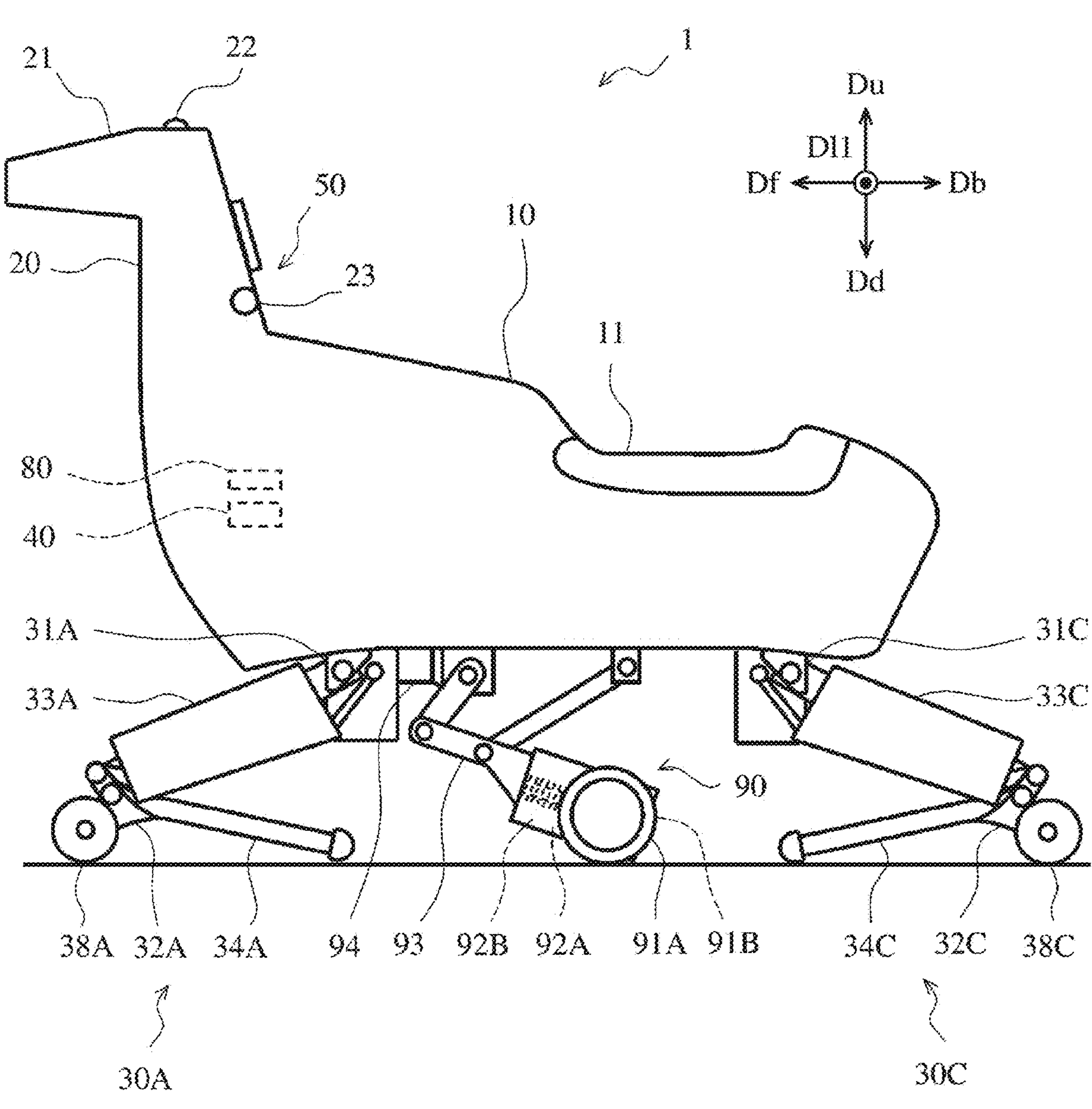
FIG. 9 is a side view illustrating an example of a state of the quadrupedal walking robot in FIG. 6 when a person gets on and off.

When a person gets on and off the robot 1, the controller 40 may control the body 10 to move in the down direction Dd by bending the leg portions 30A, 30B, 30C, and 30D, as illustrated in FIG. 9. FIG. 9 is a side view illustrating an example of a state of the quadrupedal walking robot 1 in FIG. 6 when a person gets on and off. The traveling device 90 is stored in the body 10. A height position of the body 10 controlled by the controller 40 may be a fixed height position, or may be a height position corresponding to a height position designated via the operation device 50 or the remote operation device.

The controller 40 may control the body 10 to move in the up direction Du by extending the leg portions 30A, 30B, 30C, and 30D after a person gets on the body 10 or gets off the body 10. In either or both of the movement of the body 10 in the down direction Dd and the movement of the body 10 in the up direction Du, the controller 40 may control the actuator so as to move the body 10 using the leg portions 30A, 30B, 30C, and 30D and the traveling device 90 in combination, as illustrated in FIG. 8.

Figure 10:
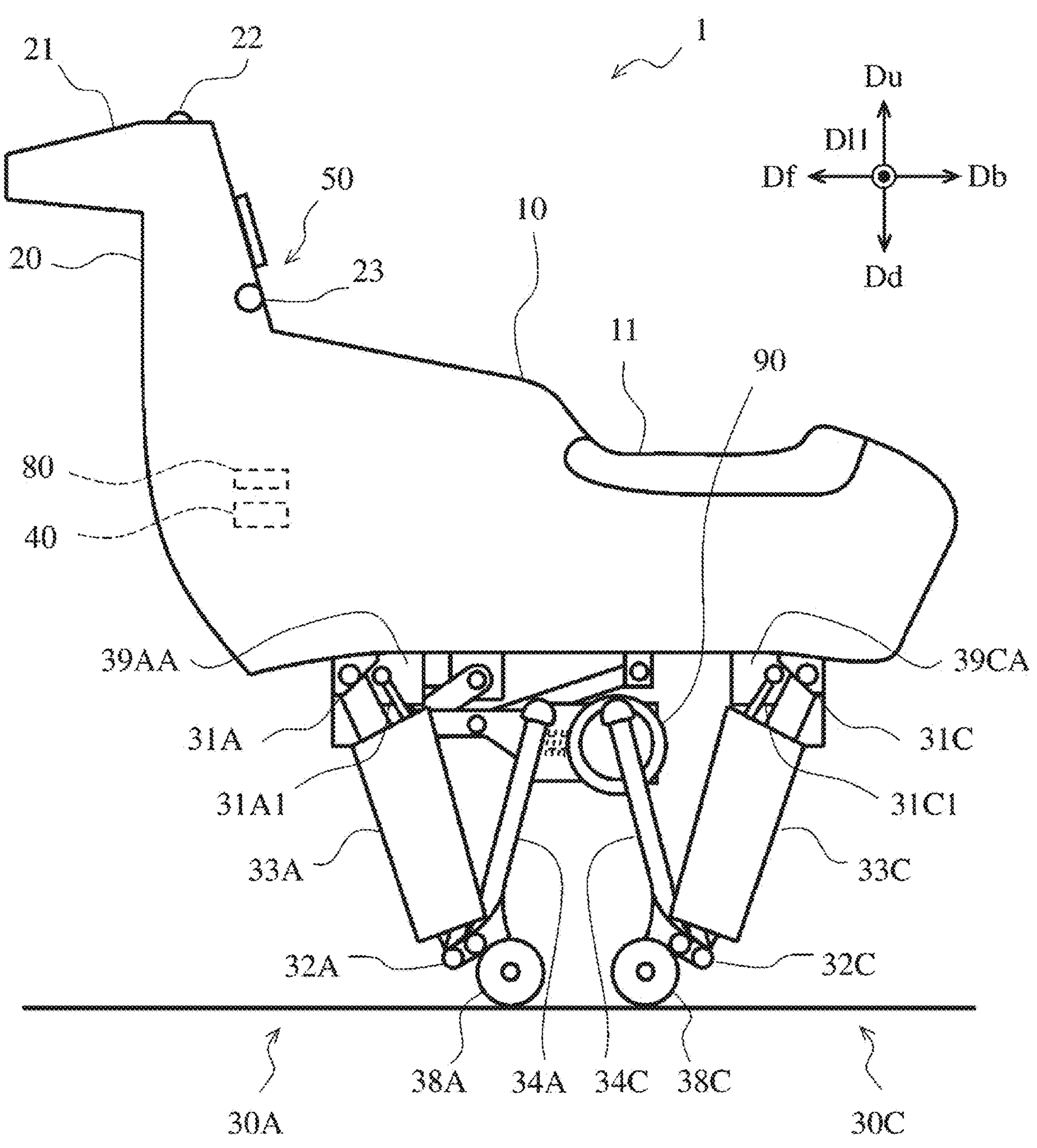
FIG. 10 is a side view illustrating an example of a suspension state of the quadrupedal walking robot in FIG. 6.

When the robot 1 is suspended, the controller 40 may perform control such that the leg portions 30A, 30B, 30C, and 30D are bent to bring the driven wheels 38A, 38B, 38C, and 38D into contact with the support surface of the robot 1, respectively, as illustrated in FIG. 10. FIG. 10 is a side view illustrating an example of a suspension state of the quadrupedal walking robot 1 in FIG. 6. The traveling device 90 is stored in the body 10.

Although not limited, in the present embodiment, the intermediate joints 32A and 32B are located in the down direction Dd with respect to the proximal joints 31A and 31B or in the back direction Db with respect to the proximal joints 31A and 31B. The intermediate joints 32C and 32D are located in the down direction Dd with respect to the proximal joints 31C and 31D or in the front direction Df with respect to the proximal joints 31C and 31D. The tips of the tip links 34A and 34B are located in the back direction Db with respect to the intermediate joints 32A and 32B, respectively, and the tips of the tip links 34C and 34D are located in the front direction Df with respect to the intermediate joints 32C and 32D, respectively. Positions of the tips of the tip links 34A, 34B, 34C, and 34D are not limited to those described above.

The robot 1 includes stoppers 39AA, 39BA, 39CA, and 39DA that inhibit an operation exceeding a predetermined amount in a predetermined direction at the proximal joints 31A, 31B, 31C, and 31D, respectively.

Although not limited, in the present embodiment, the stoppers 39AA, 39BA, 39CA, and 39DA are configured to inhibit a bending operation of the first bent portions 31A1, 31B1, 31C1, and 31D1 exceeding a predetermined amount in a predetermined direction, respectively. In addition to the first bent portions 31A1, 31B1, 31C1, and 31D1, the stoppers 39AA, 39BA, 39CA, and 39DA may inhibit a bending operation of the second bent portions 31A2, 31B2, 31C2, and 31D2 exceeding a predetermined amount in a predetermined direction, respectively.

The stoppers 39AA and 39BA inhibit the bending operation of the first bent portions 31A1 and 31B1, thereby inhibiting the intermediate links 33A and 33B from rotating exceeding a predetermined amount so as to move the intermediate joints 32A and 32B in the back direction Db, respectively. The stoppers 39AA and 39BA inhibit the intermediate links 33A and 33B from rotating so as to move the intermediate joints 32A and 32B in the back direction Db beyond the state illustrated in FIG. 10, respectively.

The stoppers 39CA and 39DA inhibit the bending operation of the first bent portions 31C1 and 31D1, thereby inhibiting the intermediate links 33C and 33D from rotating exceeding a predetermined amount so as to move the intermediate joints 32C and 32D in the front direction Df, respectively. The stoppers 39CA and 39DA inhibit the intermediate links 33C and 33D from rotating so as to move the intermediate joints 32C and 32D in the front direction Df beyond the state illustrated in FIG. 10, respectively.

The structure of the stoppers 39AA, 39BA, 39CA, and 39DA is not particularly limited as long as the operation of the proximal joints 31A, 31B, 31C, and 31D can be inhibited. For example, the stoppers 39AA, 39BA, 39CA, and 39DA may not actively operate for inhibition, or may actively operate for inhibition. For example, the stopper that does not actively operate may include one or more of an immovable engagement body engaging with a proximal joint that operates in a predetermined direction, a link coupled to the proximal joint, and the like. For example, the stopper that actively operates may include one or more of an engaging body that operates to be engaged with or fitted into a proximal joint, a driving device thereof, a brake that comes into contact with the proximal joint and inhibits the operation by friction, a driving device thereof, and the like.

The proximal joints 31A, 31B, 31C, and 31D of the robot 1 illustrated in FIG. 10 are inhibited by the stoppers 39AA, 39BA, 39CA, and 39DA, respectively. When the power supply of the actuators of all the joints of the robot 1 is turned off, the weights of the body 10 and the neck portion 20 act on the leg portions 30A, 30B, 30C, and 30D, but the proximal joints 31A, 31B, 31C, and 31D do not perform a bending operation. Accordingly, the posture of the robot 1 is maintained in the posture of FIG. 10. Even when the power supply is in the OFF state, the robot 1 may be moved by human power by rotating the driven wheels 38A, 38B, 38C, and 38D. For example, the controller 40 may cause the robot 1 to operate in the state illustrated in FIG. 10 in a situation such as when a suspension command is received from the operation device 50 or the remote operation device, or when an abnormality of the robot 1 is detected.

Figure 11:
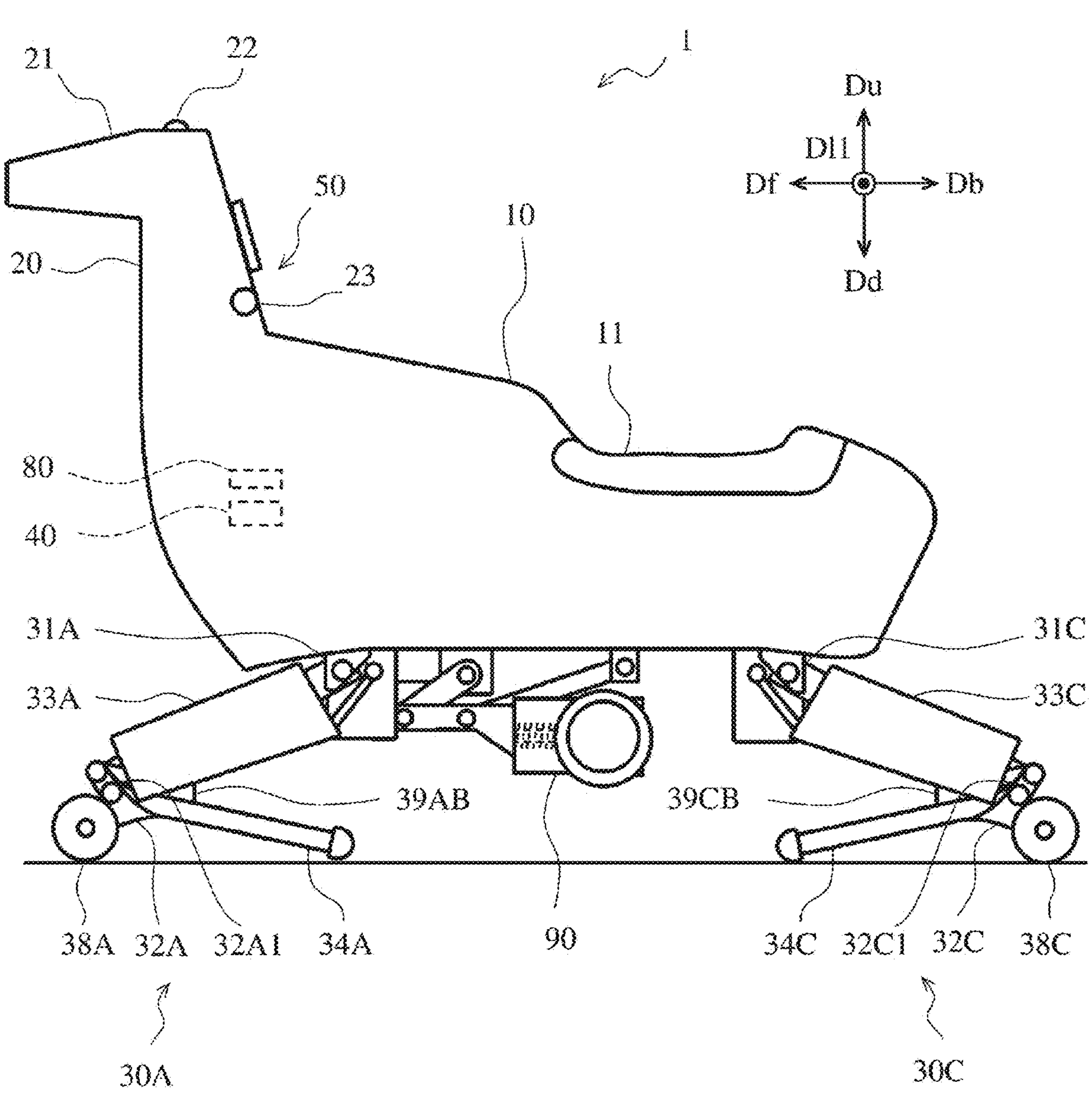
FIG. 11 is a side view illustrating an example of the suspension state of the quadrupedal walking robot in FIG. 6.

When the robot 1 is suspended, the controller 40 may perform control so that the leg portions 30A, 30B, 30C, and 30D are bent to bring the driven wheels 38A, 38B, 38C, and 38D and the tips of the tip links 34A, 34B, 34C, and 34D into contact with the support surface of the robot 1, as illustrated in FIG. 11. FIG. 11 is a side view illustrating an example of the suspension state of the quadrupedal walking robot 1 in FIG. 6. The traveling device 90 is stored in the body 10.

Although not limited, in the present embodiment, the states of the leg portions 30A, 30B, 30C, and 30D are similar to the states of the leg portions 30A, 30B, 30C, and 30D illustrated in FIG. 7. In order to stabilize the robot 1, it is preferable that the tips of the tip links 34A and 34B are located in the down direction Dd with respect to the proximal joints 31A and 31B or in the back direction Db with respect to the proximal joints 31A and 31B, respectively. In order to stabilize the robot 1, it is preferable that the tips of the tip links 34C and 34D are located in the down direction Dd with respect to the proximal joints 31C and 31D or in the front direction Df with respect to the proximal joints 31C and 31D, respectively. However, the tips of the tip links 34A and 34B may be located in the front direction Df with respect to the proximal joints 31A and 31B, and the tips of the tip links 34C and 34D may be located in the back direction Db with respect to the proximal joints 31C and 31D. In any case, the driven wheels 38A, 38B, 38C, and 38D and the tips of the tip links 34A, 34B, 34C, and 34D can support the robot 1 in a stationary state.

The robot 1 includes stoppers 39AB, 39BB, 39CB, and 39DB configured to inhibit a bending operation of the third bent portions 32A1, 32B1, 32C1, and 32D1 exceeding a predetermined amount in a predetermined direction at the intermediate joints 32A, 32B, 32C, and 32D, respectively. The stoppers 39AB, 39BB, 39CB, and 39DB inhibit a bending operation of the third bent portions 32A1, 32B1, 32C1, and 32D1 such that interior angles formed by the intermediate links 33A, 33B, 33C, and 33D and the tip links 34A, 34B, 34C, and 34D are smaller than a predetermined angle. The stoppers 39AB, 39BB, 39CB, and 39DB inhibit the third bent portions 32A1, 32B1, 32C1, and 32D1 from bending such that the interior angles are smaller than those in the state illustrated in FIG. 11.

The structures of the stoppers 39AB, 39BB, 39CB, and 39DB are not particularly limited as long as the operation of the intermediate joints 32A, 32B, 32C, and 32D can be inhibited. For example, the stoppers 39AB, 39BB, 39CB, and 39DB may include one or more of the structures illustrated for the stoppers 39AA, 39BA, 39CA, and 39DA illustrated in FIG. 10.

The intermediate joints 32A, 32B, 32C, and 32D of the robot 1 illustrated in FIG. 11 are inhibited by the stoppers 39AB, 39BB, 39CB, and 39DB, respectively. When the power supply of the actuators of all the joints of the robot 1 is turned off, the weight of the body 10 and the neck portion 20 act on the leg portions 30A, 30B, 30C, and 30D, but the intermediate joints 32A, 32B, 32C, and 32D do not perform the bending operation, and the driven wheels 38A, 38B, 38C, and 38D and the tips of the tip links 34A, 34B, 34C, and 34D come into contact with the support surface of the robot 1 to support the robot 1. At this time, the proximal joints 31A, 31B, 31C, and 31D do not perform the bending operation from the state illustrated in FIG. 11. Accordingly, the posture of the robot 1 is maintained in the posture of FIG. 11. Even when the power supply is in the OFF state, the robot 1 may be moved by human power by rotating the driven wheels 38A, 38B, 38C, and 38D. For example, the controller 40 may cause the robot 1 to operate in the state illustrated in FIG. 11 in a situation such as when a suspension command is received from the operation device 50 or the remote operation device, or when an abnormality of the robot 1 is detected.

The robot 1 may include the stoppers 39AA, 39BA, 39CA, and 39DA and the stoppers 39AB, 39BB, 39CB, and 39DB. In the case of suspension, the controller 40 may control the robot 1 to select and execute either the posture illustrated in FIG. 10 or the posture illustrated in FIG. 11 in accordance with the state of the robot 1.

Figure 12:
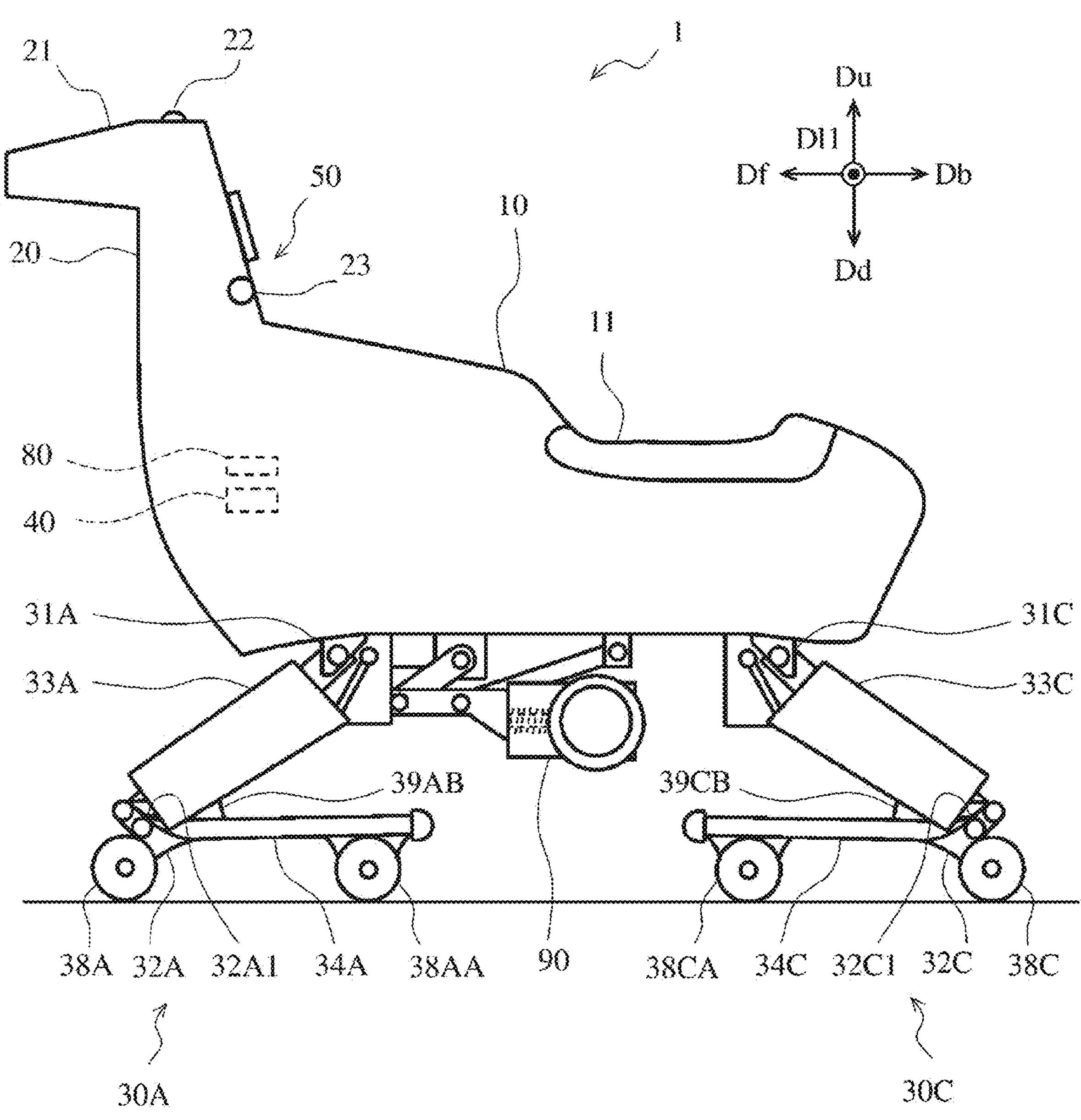
FIG. 12 is a side view illustrating another example of the quadrupedal walking robot in FIG. 11.

As illustrated in FIG. 12, the robot 1 illustrated in FIG. 11 may further include driven wheels 38AA, 38BA, 38CA, and 38DA at the tip links 34A, 34B, 34C, and 34D, respectively. FIG. 12 is a side view illustrating another example of the quadrupedal walking robot 1 in FIG. 11. The traveling device 90 is stored in the body 10. When the robot 1 is suspended, the controller 40 causes the robot 1 to operate in the same manner as in FIG. 11. The driven wheels 38AA, 38BA, 38CA, and 38DA are examples of a second wheel.

Although not limited, in the present embodiment, the states of the leg portions 30A, 30B, 30C, and 30D are similar to the states of the leg portions 30A, 30B, 30C, and 30D illustrated in FIG. 11. In order to stabilize the robot 1, it is preferable that the driven wheels 38AA and 38BA of the tip links 34A and 34B are located in the down direction Dd with respect to the proximal joints 31A and 31B or in the back direction Db with respect to the proximal joints 31A and 31B, respectively. In order to stabilize the robot 1, it is preferable that the driven wheels 38CA and 38DA of the tip links 34C and 34D are located in the down direction Dd with respect to the proximal joints 31C and 31D or in the front direction Df with respect to the proximal joints 31C and 31D, respectively. However, the driven wheels 38AA and 38BA may be located in the front direction Df with respect to the proximal joints 31A and 31B, respectively, and the driven wheels 38CA and 38DA may be located in the back direction Db with respect to the proximal joints 31C and 31D, respectively. In any case, the driven wheels 38A, 38B, 38C, 38D, 38AA, 38BA, 38CA, and 38DA can support the robot 1 in a stationary state.

When the power supply of the actuators of all the joints of the robot 1 illustrated in FIG. 12 is turned off, the intermediate joints 32A, 32B, 32C, and 32D do not perform the bending operation, and the driven wheels 38A, 38B, 38C, and 38D and the driven wheels 38AA, 38BA, 38CA, and 38DA come into contact with the support surface of the robot 1 to support the robot 1. Then, the posture of the robot 1 is maintained in the posture of FIG. 12. Even when the power supply is in the OFF state, the robot 1 may be easily moved by human power by rotating the driven wheels 38A to 38D and the driven wheels 38AA to 38DA. For example, the controller 40 may cause the robot 1 to operate in the state illustrated in FIG. 12 in a situation such as when a suspension command is received from the operation device 50 or the remote operation device, or when an abnormality of the robot 1 is detected.

The robot 1 may include the stoppers 39AA, 39BA, 39CA, and 39DA and the stoppers 39AB, 39BB, 39CB, and 39DB. In the case of suspension, the controller 40 may control the robot 1 to select and execute either the posture illustrated in FIG. 10 or the posture illustrated in FIG. 12 in accordance with the state of the robot 1.

FIG. 13 is a block diagram illustrating an example of a configuration of the controller 40 of the quadrupedal walking robot 1 according to the embodiment. As illustrated in FIG. 13, the controller 40 includes a computer, and may be, for example, an electronic circuit board, an electronic control unit, or a microcomputer. The controller 40 includes a circuit or a processing circuit, and the circuit or the processing circuit includes a processor P and a memory M. The circuit may include a processing circuit. The processor P and the memory M transmit and receive a command, information, data, and the like to and from another device. The processor P and the memory M input a signal from various devices and output a control signal to a control target.

For example, the memory M may include a volatile semi-conductor memory such as a random access memory (RAM), a nonvolatile semi-conductor memory such as a read-only memory (ROM), a hard disk, a solid state drive (SSD), or a combination thereof. The memory M stores a program to be executed by the processor P, various types of data, and the like.

At least a part of a plurality of functions of the controller 40 may be implemented by cooperation of the processor P and the memory M. The processor P and the memory M including the RAM and the ROM form a computer system. For example, the computer system may implement the above functions by the processor P executing a program recorded in the ROM using the RAM as a work area.

A part or all of the functions of the controller 40 may be implemented by the computer system, may be implemented by a dedicated hardware circuit such as an electronic circuit or an integrated circuit, or may be implemented by a combination of the computer system and the hardware circuit. The controller 40 may execute processing by centralized control by a single computer or by distributed control by cooperation of a plurality of computers.

Without being limited to the following, the processor P may include, for example, one or more of a central processing unit (CPU), a micro processing unit (MPU), a graphics processing unit (GPU), a microprocessor, a processor core, a multiprocessor, an application-specific integrated circuit (ASIC), a field programmable gate array (FPGA), and a reconfigurable processor. The processor P may implement processing by a logic circuit or a dedicated circuit which is a hardware circuit formed in an integrated circuit such as an integrated circuit (IC) chip and a large scale integration (LSI). The plurality of functions of the controller 40 may be implemented by an integrated circuit that is individually integrated into one chip, or may be implemented by an integrated circuit that is integrated into one chip so as to include a part or all of the functions.

The controller 40 is connected to the sensors 22 and 24, the operation device 50, the secondary battery module 60, the power supply circuit 70, the communication device 80, the actuators 35A to 37A of the leg portion 30A, the actuators 35B to 37B of the leg portion 30B, the actuators 35C to 37C of the leg portion 30C, the actuators 35D to 37D of the leg portion 30D, and the actuators 92A, 92B, and 94 of the traveling device 90.

The robot 1 includes the sensor 22 as a first sensor, and further includes the sensor 24 as a second sensor. The second sensor 24 is disposed in the body 10. The second sensor 24 detects movement of the body 10. Although not limited, in the present embodiment, the second sensor 24 includes a gyro sensor and detects an angular speed of the body 10. For example, the second sensor 24 detects an angular speed around three orthogonal axes. The second sensor 24 may further include an acceleration sensor and detect an acceleration of the body 10. For example, the second sensor 24 may detect an acceleration in three orthogonal axis directions. The second sensor 24 may include an inertial measurement device. The second sensor 24 outputs a signal indicating a detection result to the controller 40.

The controller 40 receives and processes a signal indicating a detection result from the first sensor 22. In a case where the first sensor 22 includes a three-dimensional camera, the controller 40 may process an image received from the first sensor 22 and detect a capturing object included in the image and a distance between the capturing object and the sensor 22. Further, the controller 40 may detect a three-dimensional position of the capturing object. The first sensor 22 may include a processing circuit or the like that performs the image processing. The controller 40 may output a processing result to either or both of the operation device 50 and a remote operation device T, or may use the processing result for processing to be executed by the controller 40 itself, such as control of the robot 1.

The controller 40 receives and processes the signal indicating the detection result from the second sensor 24. The controller 40 may process the signal received from the second sensor 24 and detect the angular speed and the acceleration of the body 10. The second sensor 24 may include a processing circuit or the like that performs detection processing of the angular speed and the acceleration. The controller 40 may use a detection result for processing to be executed by the controller 40 itself, such as posture control of the robot 1.

The controller 40 communicates with the remote operation device T via the communication device 80. The controller 40 processes a signal received from the remote operation device T and executes a command included in the signal. The controller 40 stores information and data included in the signal in the memory M or the like, and uses the information and data for processing to be executed by the controller 40 itself. The controller 40 transmits various types of information and data to the remote operation device T.

The controller 40 processes a signal received from the operation device 50 and executes a command included in the signal. The controller 40 stores information and data included in the signal in the memory M or the like, and uses the information and data for processing to be executed by the controller 40 itself. The controller 40 outputs various types of information and data to the operation device 50.

The controller 40 may receive, from the remote operation device T and the operation device 50, a signal indicating various settings of the robot 1, setting of the execution task in the autonomous driving mode, setting of the movement destination, selection of the operation mode, selection of the walking mode, selection of the operation method in the manual driving mode, manual operation in the manual driving mode, selection of the posture of the robot 1 at the time of getting on and off, selection of the posture of the robot 1 at the time of suspension, and the like.

The controller 40 is configured to be connected to an external power supply EP via a first power supply circuit 70*a* of the power supply circuit 70. The controller 40 controls charging of the power of the external power supply EP to the secondary battery module 60 by controlling the first power supply circuit 70*a*.

The controller 40 is connected to the actuators 35A to 37A, 35B to 37B, and 35D to 37D of the leg portions 30A to 30D via a second power supply circuit 70*b* of the power supply circuit 70. The controller 40 outputs a command value of a current from the actuators 35A to 37A, 35B to 37B, and 35D to 37D to the second power supply circuit 70*b*, and the second power supply circuit 70*b* supplies the current in accordance with the command value from the secondary battery module 60 to the actuators 35A to 37A, 35B to 37B, and 35D to 37D. The controller 40 acquires a detection result of the rotation sensor E of each of the actuators 35A to 37A, 35B to 37B, and 35D to 37D and the current value of the actuators via the second power supply circuit 70*b*, and uses the detection result and the current value as feedback information at the time of determining the command value of the current. That is, the controller 40 servo-controls the servomotors SM of the actuators 35A to 37A, 35B to 37B, and 35D to 37D.

The controller 40 is connected to the actuators 92A, 92B, and 94 of the traveling device 90 via a third power supply circuit 70*c* of the power supply circuit 70. The controller 40 outputs a command value of the current to the actuators 92A, 92B, and 94 to the third power supply circuit 70*c*, and the third power supply circuit 70*c* supplies the current in accordance with the command value from the secondary battery module 60 to the actuators 92A, 92B, and 94. The controller 40 acquires the detection result of the rotation sensor E of each of the actuators 92A, 92B, and 94 and the current value of each actuator via the third power supply circuit 70*c*, and uses the detection result and the current value as feedback information at the time of determining the command value of the current. That is, the controller 40 servo-controls the servomotors SM of the actuators 92A, 92B, and 94.

In the autonomous driving mode, the controller 40 executes a program for autonomous driving in accordance with a command including an execution task and a movement destination received from the operation device 50 or the remote operation device T. For example, the program for autonomous driving includes control data including information such as positions and speeds of the leg portions 30A to 30D to be executed by the robot 1. The control data may include information such as a position, a moving direction, and a speed of the robot 1, which is to be executed by the robot 1. The control data may be teaching data set through a teaching operation.

In the quadrupedal walking mode, the controller 40 calculates target positions, target speeds, and the like of the leg portions 30A to 30D using the control data, the processing results of the detection signals of the sensors 22 and 24, and the like. The controller 40 determines the command value of the current to the actuators 35A to 37A, 35B to 37B, and 35D to 37D so as to set the leg portions 30A to 30D to the target positions, the target speeds, and the like.

For example, the controller 40 reflects the processing result related to the first sensor 22 in the above calculation, thereby calculating the target position, the target speed, and the like corresponding to a state of a ground surface around the robot 1, a position of an object, and the like. Accordingly, the controller 40 can cause the leg portions 30A to 30D to change the movement of the leg portions 30A to 30D, change the movement trajectory, decelerate, stop, and the like. For example, the controller 40 reflects the processing result related to the second sensor 24 in the above calculation, thereby calculating the target position, the target speed, and the like that balance the robot 1 in accordance with the movement, the posture, and the like of the body 10.

In the wheel traveling mode, the controller 40 calculates a target position, a target speed, and the like of the robot 1 using control data and the like. The controller 40 determines the command value of the current to the actuators 92A and 92B based on the target position, the target speed, and the like of the robot 1.

The controller 40 may use the processing result of the detection signals of the sensors 22 and 24 for the above calculation. For example, the controller 40 may calculate the target positions, the target speeds, and the like of the leg portions 30A to 30D corresponding to the state of the ground surface around the robot 1, the position of the object, and the like by using the processing result related to the first sensor 22. Accordingly, the controller 40 may operate the leg portions 30A to 30D so as to change a positional relation in a horizontal direction and a vertical direction between the driven wheels 38A to 38D and the traveling wheels 91A and 91B in accordance with the state of the ground surface. For example, the balance of the robot 1 may be adjusted by changing the positional relation in the horizontal direction. By changing the positional relation in the vertical direction, the leg portions 30A to 30D can function as suspensions to reduce vibration and impact. The controller 40 may calculate the target position, the target speed, and the like of the robot 1 to change the traveling direction of the robot 1, decelerate, stop, and the like in accordance with the position of the surrounding object.

For example, the controller 40 may calculate the target positions, the target speeds, and the like of the leg portions 30A to 30D so as to balance the robot 1 in accordance with the movement, the posture, and the like of the body 10 by using the processing result related to the second sensor 24. Accordingly, the controller 40 may operate the leg portions 30A to 30D so as to change the positional relation in the horizontal direction and the vertical direction between the driven wheels 38A to 38D and the traveling wheels 91A and 91B in accordance with the movement, the posture, and the like of the body 10.

In the manual driving mode, the controller 40 executes a program for manual driving. The controller 40 receives, from the operation device 50 or the remote operation device T, a signal indicating a content of a manual operation input to the operation device 50 or the remote operation device T.

In the quadrupedal walking mode, the controller 40 calculates the target positions, the target speeds, and the like of the leg portions 30A to 30D by processing the signal indicating the content of the manual operation in accordance with the program for manual driving. The controller 40 determines the command value of the current to the actuators 35A to 37A, 35B to 37B, and 35D to 37D based on the target positions and the target speeds of the leg portions 30A to 30D.

The controller 40 may use the processing results of the detection signals of the sensors 22 and 24 to calculate the target positions, the target speeds, and the like of the leg portions 30A to 30D. For example, the controller 40 may calculate the target position, the target speed, and the like corresponding to the state of the ground surface around the robot 1 by using the processing result related to the first sensor 22. The controller 40 may stop or decelerate the operations of the leg portions 30A to 30D in order to avoid collision, contact, and the like of the robot 1 corresponding to the position of the object around the robot 1. For example, the controller 40 may calculate the target position, the target speed, and the like so as to balance the robot 1 in accordance with the movement, the posture, and the like of the body 10 by using the processing result of the detection signal of the second sensor 24. Accordingly, even when the command by the manual operation is a simple command indicating the forward movement, the backward movement, the left turn, the right turn, the traveling speed, and the like of the robot 1, the controller 40 can cause the robot 1 to operate in accordance with the situation around the robot 1 and the balance of the robot 1.

In the wheel traveling mode, the controller 40 calculates the target position, the target speed, and the like of the robot 1 by processing the signal indicating the content of the manual operation in accordance with the program for manual driving. The controller 40 determines the command value of the current to the actuators 92A and 92B based on the target position, the target speed, and the like of the robot 1.

The controller 40 may use the processing result of the detection signals of the sensors 22 and 24 for the above calculation. For example, the controller 40 may calculate the target positions, the target speeds, and the like of the leg portions 30A to 30D so as to change the positional relation in the horizontal direction and the vertical direction between the driven wheels 38A to 38D and the traveling wheels 91A and 91B in accordance with the state of the ground surface around the robot 1 by using the processing result related to the first sensor 22. For example, the balance of the robot 1 may be adjusted by changing the positional relation in the horizontal direction. By changing the positional relation in the vertical direction, the leg portions 30A to 30D can function as suspensions to reduce vibration and impact. The controller 40 may stop or decelerate the traveling of the robot 1 in order to avoid collision, contact, or the like of the robot 1 corresponding to the position of the object around the robot 1. The controller 40 may calculate the target positions, the target speeds, and the like of the leg portions 30A to 30D so as to balance the robot 1 in accordance with the movement, the posture, and the like of the body 10 by using the processing result related to the second sensor 24.

In the quadrupedal walking mode of the autonomous driving mode and the manual driving mode, the controller 40 may use the leg portions 30A, 30B, 30C, and 30D and the traveling device 90 in combination, as illustrated in FIG. 8, in accordance with the program, the detection result of the first sensor 22, or the command from the operation device 50 or the remote operation device T. The controller 40 may calculate the target positions, the target speeds, and the like of the traveling wheels 91A and 91B of the traveling device 90 to be balanced with the leg portions 30A, 30B, 30C, and 30D using the processing results related to the sensors 22 and 24.

In the wheel traveling mode of the autonomous driving mode and the manual driving mode, the controller 40 may perform control to use the leg portions 30A, 30B, 30C, and 30D and the traveling device 90 in combination, as illustrated in FIG. 8, in accordance with the program, the detection result of the first sensor 22, or the command from the operation device 50 or the remote operation device T. The controller 40 may calculate the target positions, the target speeds, and the like of the leg portions 30A, 30B, 30C, and 30D to be balanced with the traveling device 90 using the processing results related to the sensors 22 and 24.

In either mode, the controller 40 may calculate the target positions, the target speeds, and the like of the leg portions 30A to 30D for raising and lowering the body 10 when a person gets on and off the robot 1, as illustrated in FIG. 9, in accordance with the program or the command from the operation device 50 or the remote operation device T.

In either mode, the controller 40 may calculate the target positions, the target speeds, and the like of the leg portions 30A to 30D for suspending the robot 1 in accordance with the program or the command from the operation device 50 or the remote operation device T. For example, when the traveling device 90 protrudes from the body 10, the controller 40 may calculate the target position, the target speed, and the like of the traveling device 90 to be stored in the body 10. The controller 40 may determine a state to be used for suspension from the state of the robot 1 illustrated in FIG. 10 and the state of the robot 1 illustrated in FIG. 11 or FIG. 12 based on the processing results related to the sensors 22 and 24. The controller 40 may calculate the target positions, the target speeds, and the like of the leg portions 30A to 30D corresponding to the determined state of the robot 1.

Although not limited, in the present embodiment, the controller 40 autonomously executes a switching operation for the walking mode between the quadrupedal walking mode and the wheel traveling mode. In the autonomous driving mode, the controller 40 may determine the walking mode in accordance with the command of the walking mode included in the control data. The controller 40 may determine the walking mode in accordance with the state of the ground surface based on the detection result of the first sensor 22. At the time of switching the walking mode, the controller 40 may calculate the target positions, the target speeds, and the like of the leg portions 30A to 30D based on information such as the positions, the speeds, and the like of the leg portions 30A to 30D related to the switching operation included in the control data, the processing result of the detection signal of the second sensor 24, and the like.

In the manual driving mode, the controller 40 receives a signal designating the walking mode from the operation device 50 or the remote operation device T. At the time of switching the walking mode, the controller 40 acquires information such as the positions and speeds of the leg portions 30A to 30D related to the switching operation from the program for manual driving, but may acquire the information from control data of the program for autonomous driving. The controller 40 may calculate the target positions, the target speeds, and the like of the leg portions 30A to 30D based on the above information, the processing result of the detection signal of the second sensor 24, and the like.

In the quadrupedal walking mode of the autonomous driving mode, the controller 40 controls the operations of the leg portions 30A to 30D in accordance with the program for autonomous driving while reflecting the detection results of the sensors 22 and 24 in the control in order to cause the robot 1 to autonomously execute the task as illustrated in FIG. 6. The controller 40 may change the state of the robot 1 from the quadrupedal walking mode to the wheel traveling mode in accordance with the program, the detection result of the first sensor 22, or the command from the operation device 50 or the remote operation device T.

In the wheel traveling mode of the autonomous driving mode, the controller 40 controls the operation of the traveling device 90 in accordance with the program for autonomous driving in order to cause the robot 1 to autonomously execute the task as illustrated in FIG. 7. The controller 40 may control operations of the traveling device 90 and the leg portions 30A to 30D in accordance with the detection results of the sensors 22 and 24. The controller 40 may change the state of the robot 1 from the wheel traveling mode to the quadrupedal walking mode in accordance with the program, the detection result of the first sensor 22, or the command from the operation device 50 or the remote operation device T.

In the quadrupedal walking mode of the manual driving mode, the controller 40 controls the operations of the leg portions 30A to 30D to cause the robot 1 as illustrated in FIG. 6 to walk in accordance with the manual operation of the operation device 50 or the remote operation device T. The controller 40 may control the operations of the leg portions 30A to 30D in accordance with the detection results of the sensors 22 and 24. The controller 40 may change the state of the robot 1 from the quadrupedal walking mode to the wheel traveling mode in accordance with the detection result of the first sensor 22 or the command from the operation device 50 or the remote operation device T.

In the wheel traveling mode of the manual driving mode, the controller 40 controls the operation of the traveling device 90 to cause the robot 1 as illustrated in FIG. 7 to travel in accordance with the manual operation of the operation device 50 or the remote operation device T. The controller 40 may control operations of the traveling device 90 and the leg portions 30A to 30D in accordance with the detection results of the sensors 22 and 24. The controller 40 may change the state of the robot 1 from the wheel traveling mode to the quadrupedal walking mode in accordance with the detection result of the first sensor 22 or the command from the operation device 50 or the remote operation device T.

In either mode, the controller 40 can control the robot 1 in accordance with either of a command from the operation device 50 operated by a user riding on the robot 1 or a command from the remote operation device T operated by a user away from the robot 1.

Other Embodiments

Although the embodiment of the present disclosure has been described above, the present disclosure is not limited to the above-described embodiment. That is, various modifications and improvements may be made within the scope of the present disclosure. For example, embodiments obtained by applying various modifications to the embodiment and embodiments constructed by combining components in different embodiments are also included in the scope of the present disclosure.

For example, in the robot 1 according to the embodiment, the leg portions 30A and 30B are connected to the body 10 at positions biased in the front direction Df, and the leg portions 30C and 30D are connected to the body 10 at positions biased in the back direction Db, but the present invention is not limited thereto. Connection positions between the leg portions 30A to 30D and the body 10 may be arranged in any manner.

In the robot 1 according to the embodiment, the proximal joints 31A to 31D of the leg portions 30A to 30D are bent around two axes of the pitching direction and the rolling direction with respect to the body 10 when the intermediate links 33A to 33D extend in the down direction Dd, but the present invention is not limited thereto. For example, the proximal joints 31A to 31D may be bent around two axes of the pitching direction and the yawing direction or around two axes of the rolling direction and the yawing direction with respect to the body 10 when the intermediate links 33A to 33D extend in the down direction Dd. The proximal joints 31A to 31D may be bent around other two axes with respect to the body 10. Further, the proximal joints 31A to 31D may be bent around three or more axes with respect to the body 10.

In the robot 1 according to the embodiment, the intermediate joints 32A to 32D of the leg portions 30A to 30D are bent in the pitching direction with respect to the body 10 when the leg portions 30A to 30D extend in the down direction Dd, but the present invention is not limited thereto. For example, the intermediate joints 32A to 32D may be bent in the yawing direction, the rolling direction, or another direction with respect to the body 10 when the leg portions 30A to 30D extend in the down direction Dd. The intermediate joints 32A to 32D may be bent around two or more axes. When one leg portion includes two or more intermediate joints, bending directions of the intermediate joints may be the same as or different from each other.

In the robot 1 according to the embodiment, the joints of the leg portions 30A to 30D and the actuator of the traveling device 90 include the servomotor SM as a drive source, and the servomotor SM is a rotary electric motor, but the drive source of the actuator is not limited to a rotary electric motor. For example, the actuator may include, as the drive source, a rotary electric motor, a direct-acting electric motor, a rotary hydraulic pressure or gas pressure motor, a direct-acting hydraulic pressure or gas pressure motor, or a combination of two or more thereof. The various motors may be or may not be servomotors.

The robot 1 according to the embodiment includes the footrest 12 fixed to the body 10, but the present invention is not limited thereto. The footrest 12 may change its position with respect to the body 10. For example, the footrest 12 may be movable in the up and down directions, the front and back directions, or a combination thereof with respect to the body 10. Accordingly, the footrest 12 can be moved in accordance with the build of the person riding on the robot 1, and the load on the legs of the person can be reduced.

The robot 1 according to the embodiment includes the seat portion 11 on which a person is placed, but may further load an object. For example, the robot 1 may include one or more of a carrier on which an object is placed, a hanging tool for hanging an object, an attachment tool for a box that accommodates an object, and the like in one or more of the seat portion 11, the body 10, and the neck portion 20.

The robot 1 according to the embodiment includes the neck portion 20, but may not include the neck portion 20. In this case, the handle 23 may be disposed on the body 10. The handle 23 may be disposed at a position where a person seated on the seat portion 11 can grip the handle 23, and may be disposed at a component of the robot 1 other than the neck portion 20 even when the robot 1 includes the neck portion 20.

The appearance of the robot 1 according to the embodiment is not limited to the appearance imitating a limbs-mammal. For example, the appearance of the robot 1 excluding the leg portions 30A to 30D may be any appearance. For example, the appearance of the robot 1 excluding the leg portions 30A to 30D may be an appearance imitating various vehicles such as a motorcycle, a rotating vehicle, an automatic vehicle including three or more wheels, a ship, and an aircraft.

The robot 1 according to the embodiment uses the secondary battery module 60 as the power source, but the present invention is not limited thereto. For example, the robot 1 may use an external power supply such as a commercial power source as the power source. In this case, the robot 1 may be electrically connected to the external power supply via a wire or contact, and may operate while receiving power supply from the external power supply.

Examples of aspects of the technique of the present disclosure are as follows. A quadrupedal walking robot according to an aspect of the present disclosure includes a main body including a seat portion on which a person is to sit astride; a handle to be gripped by the person seated on the seat portion; four leg portions coupled to the main body and configured to perform a bending operation, each of the four leg portions including two or more joints; a plurality of actuators configured to drive the plurality of joints; an operation device disposed on the handle and configured to receive an input of a command related to an operation of the quadrupedal walking robot; and a controller configured to control the plurality of actuators in accordance with the command received from the operation device.

According to the above aspect, the main body of the quadrupedal walking robot has a shape and dimensions that allow a person to operate the operation device of the handle in a state of being seated on the seat portion over the main body. Accordingly, the main body has a compact structure. Each of the leg portions includes two or more joints, and thus can take various postures. Accordingly, by moving the main body in the up and down directions, the quadrupedal walking robot can easily allow a person to get on and off the quadrupedal walking robot. Further, the quadrupedal walking robot can walk on a ground surface having various terrains. Accordingly, a compact quadrupedal walking robot that may be used for daily use is provided.

In the quadrupedal walking robot according to an aspect of the present disclosure, the main body includes a first recessed portion recessed to receive a leg of the person seated on the seat portion at a portion located in a first lateral direction in the main body and located in a down direction with respect to the seat portion in the main body, and a second recessed portion recessed to receive a leg of the person seated on the seat portion at a portion located in a second lateral direction in the main body and located in a down direction with respect to the seat portion in the main body, and the first lateral direction and the second lateral direction of the main body are opposite directions and are directions intersecting front and back directions and up and down directions of the main body.

According to the above aspect, the person seated on the seat portion can easily support his/her body with the legs in the first recessed portion and the second recessed portion sandwiching the main body. The legs of the person seated on the seat portion may be held by portions of the main body in front of and behind the first recessed portion and the second recessed portion so as not to slide in the front and back directions. Accordingly, the quadrupedal walking robot can carry a person in a stable state.

In the quadrupedal walking robot according to an aspect of the present disclosure, the seat portion includes a seat surface on which the person is to be seated astride, and a first portion located in the back direction with respect to the seat surface in the main body and higher than the seat surface in the up direction of the main body. According to the above aspect, the first portion supports the person seated on the seat surface from behind. The first portion can reduce the burden on the body required for a person to stably sit on the seat surface.

In the quadrupedal walking robot according to an aspect of the present disclosure, the main body includes a second portion located in the front direction with respect to the seat portion in the main body and higher than the seat portion in the up direction of the main body. According to the above aspect, the second portion supports the person seated on the seat surface from the front. The person seated on the seat surface leans his/her body on the second portion, thereby reducing a load on the body. The second portion can reduce the burden on the body required for a person to sit on the seat surface.

In the quadrupedal walking robot according to an aspect of the present disclosure, the second portion protrudes in a first lateral direction and a second lateral direction of the main body with respect to a third portion located in a down direction with respect to the seat portion in the main body, and the first lateral direction and the second lateral direction of the main body are opposite directions and are directions intersecting front and back directions and the up and down directions of the main body. According to the above aspect, a person seated on the seat portion can sandwich the main body from the first recessed portion and the second recessed portion over the second portion by his/her two legs in a state where his/her knees are opened in the lateral direction. The second portion can reduce the load on the body of the person when the main body is sandwiched by his/her legs.

In the quadrupedal walking robot according to an aspect of the present disclosure, the handle includes a bar to be gripped by the person seated on the seat portion, and the operation device includes either or both of a joystick and a key disposed on the bar. According to the above aspect, a person seated on the seat portion can operate the operation device with a hand gripping the bar. The person can operate the operation device while stabilizing his/her body by supporting his/her body with his/her arms.

The quadrupedal walking robot according to an aspect of the present disclosure further includes a footrest which is disposed in a state of hanging down from the main body and on which the person seated on the seat portion is to put his/her feet. According to the above aspect, a person can sit on the seat portion in a state where his/her feet is supported at a position in the down direction with respect to the main body. Accordingly, a bending angle of his/her legs of the person at his/her knees is increased. The footrest can reduce the load on his/her legs.

The quadrupedal walking robot according to an aspect of the present disclosure further includes a sensor configured to scan a periphery of the quadrupedal walking robot, in which the controller is configured to process a signal received from the sensor and configured to detect either or both of an object around the quadrupedal walking robot and a position of the object. According to the above aspect, the controller can use information on the surrounding object and information on the position of the surrounding object as information to be provided to an operator of the quadrupedal walking robot and the control of the quadrupedal walking robot.

In the quadrupedal walking robot according to an aspect of the present disclosure, the sensor includes a camera, and the controller is configured to process an image signal received from the camera and configured to detect either or both of the object around the quadrupedal walking robot and the position of the object.

According to the above aspect, the controller detects information on various capturing objects reflected in an image of the camera and information on positions of the capturing objects, as the information on the surrounding object and the information on the position of the surrounding object. Since the information on the capturing object and the information on the position of the capturing object are obtained by processing the image, various types of information can be included. By using the information on the capturing object and the information on the position of the capturing object, the controller can perform accurate control of the quadrupedal walking robot and accurate information provision to an operator of the quadrupedal walking robot.

In the quadrupedal walking robot according to an aspect of the present disclosure, the controller is configured to receive a command of a task to be executed by the quadrupedal walking robot, and control the plurality of actuators so as to cause the quadrupedal walking robot to autonomously travel in accordance with a predetermined program for executing the task, based on a processing result of the signal received from the sensor. According to the above aspect, the controller causes the quadrupedal walking robot to autonomously execute the task in accordance with the processing result of the signal received from the sensor. For example, the controller can cause the quadrupedal walking robot to reliably execute the task by causing the quadrupedal walking robot to execute the operation in accordance with the information on the surrounding object and the information on the position of the surrounding object.

In the quadrupedal walking robot according to an aspect of the present disclosure, the controller is configured to communicate, via wireless communication, with a wireless operation device configured to receive an input of a command related to an operation of the quadrupedal walking robot, and the controller is configured to control operations of the plurality of actuators in accordance with the command received from the wireless operation device, and transmit the processing result of the signal received from the sensor to the wireless operation device. According to the above aspect, the controller can receive a remote operation by the wireless operation device, and can control the quadrupedal walking robot in accordance with the remote operation. The controller transmits the processing result of the signal received from the sensor to the wireless operation device, thereby facilitating the operation of the operator.

In the quadrupedal walking robot according to an aspect of the present disclosure, each of the four leg portions includes a proximal joint coupled to the main body and one or more intermediate joints disposed between the proximal joint and a tip of the leg portion, the proximal joint is configured to operate with two or more degrees of freedom, and the intermediate joint is configured to operate with one or more degrees of freedom. According to the above aspect, the leg portion can perform various movements. The quadrupedal walking robot can walk in various walking modes, and can walk on a ground surface in various states including inclination, a step, unevenness, and the like.

In the quadrupedal walking robot according to an aspect of the present disclosure, each of the proximal joints of the four leg portions includes a first bent portion configured to be bent about a second axis extending in a direction intersecting a first axis extending in up and down directions in the main body, and a second bent portion configured to be bent about a third axis extending in a direction intersecting the first axis and the second axis, and the one or more intermediate joints of each of the four leg portions include a third bent portion configured to be bent to change an angle formed by portions on both sides of the intermediate joint in the leg portion. According to the above aspect, the leg portion can move close to the limbs-mammal and human legs.

In the quadrupedal walking robot according to an aspect of the present disclosure, in each of the four leg portions, the one or more joints between the joint coupled to the main body and the tip of the leg portion include a first wheel which is rotatable, and the first wheel is configured to come into contact with a support surface supporting the quadrupedal walking robot as the joint operates, thereby supporting the quadrupedal walking robot.

According to the above aspect, the quadrupedal walking robot can move without walking with the leg portion in a state where the first wheel is in contact with the support surface. For example, the controller can select walking with the leg portion and movement by the wheel in accordance with the state of the support surface, and cause the quadrupedal walking robot to move.

In the quadrupedal walking robot according to an aspect of the present disclosure, the first wheel is configured to change a traveling direction of the first wheel by moving together with the leg portion operated by the joint in a state of being in contact with the support surface. According to the above aspect, the quadrupedal walking robot can operate the joint to move the leg portion, thereby changing the traveling direction. The structure for changing the traveling direction of the quadrupedal walking robot is simplified.

In the quadrupedal walking robot according to an aspect of the present disclosure, each of the four leg portions further includes a stopper configured to inhibit an operation of the one or more joints, the controller is configured to control the plurality of actuators so as to operate the four leg portions in a state where the stopper inhibits the operation of the one or more joints and the first wheel is in contact with the support surface in a predetermined case, and the predetermined case includes either or both of a case where the quadrupedal walking robot is suspended and a case where a person gets on and off the quadrupedal walking robot.

According to the above aspect, in the predetermined case, each of the four leg portions supports the quadrupedal walking robot in a state where the operation of the joint is inhibited by the stopper. Even in a state where the actuator is in the OFF state and a driving force is not generated, the joints of the four leg portions are supported by the stoppers so that the bending does not progress due to the weight of the quadrupedal walking robot. The quadrupedal walking robot can maintain the posture in which the first wheel is in contact with the support surface even when the actuator is in the OFF state. In a state where the actuator is in the OFF state, the movement of the quadrupedal walking robot using the first wheel and getting on and off of a person to and from the quadrupedal walking robot are possible.

In the quadrupedal walking robot according to an aspect of the present disclosure, each of the four leg portions includes, as the stopper, a first stopper configured to inhibit an operation of the joint coupled to the main body, and the controller is configured to control the plurality of actuators to operate the four leg portions in a state where the first stopper inhibits the operation of the joint and the first wheel is in contact with the support surface in the predetermined case.

According to the above aspect, in the predetermined case, the first stopper inhibits the operation of the joint coupled to the main body. Even when the actuator is in the OFF state, the quadrupedal walking robot can maintain a posture in which proximal portions of the four leg portions are inhibited in a predetermined state by the first stopper.

In the quadrupedal walking robot according to an aspect of the present disclosure, each of the four leg portions includes, as the stopper, a second stopper configured to inhibit an operation of the joint on which the first wheel is disposed, and the controller is configured to control the plurality of actuators to operate the four leg portions in a state where the second stopper inhibits the operation of the joint and the first wheel is in contact with the support surface in the predetermined case.

According to the above aspect, in the predetermined case, the second stopper inhibits the operation of the joint on which the first wheel is disposed. Even when the actuator is in the OFF state, the quadrupedal walking robot can maintain a posture in which peripheral portions of the first wheels at the four leg portions are inhibited in the predetermined state by the second stopper.

In the quadrupedal walking robot according to an aspect of the present disclosure, each of the four leg portions further includes a second wheel, which is rotatable, between the tip of the leg portion and the joint on which the first wheel is disposed, and the second wheel comes into contact with the support surface in the state where the second stopper inhibits an operation of the joint and the first wheel is in contact with the support surface.

According to the above aspect, in the predetermined case, the second stopper inhibits the operation of the joint on which the first wheel is disposed, and the first wheel and the second wheel come into contact with the support surface. The quadrupedal walking robot in the predetermined case is stabilized.

The functions of the elements disclosed in the present description can be executed using a circuit or a processing circuit including a general-purpose processor, a dedicated processor, an integrated circuit, an ASIC, a conventional circuit, and/or a combination thereof configured or programmed to execute the disclosed functions. The processor includes a transistor and other circuits, and thus is regarded as a processing circuit or a circuit. In the present disclosure, the circuit, the unit, and the means are hardware that executes the listed functions or hardware that is programmed to execute the listed functions. The hardware may be the hardware disclosed in the present description, or may be another known hardware configured or programmed to execute the listed functions. When the hardware is a processor considered as a kind of circuit, the circuit, the means, or the unit is a combination of hardware and software, and the software is used for the hardware and/or processor.

The numbers such as the ordinal number and the quantity used above are all exemplified for specifically describing the technique of the present disclosure, and the present disclosure is not limited to the illustrated numbers. The connection relation between the components is exemplified for specifically describing the technique of the present disclosure, and the connection relation implementing the function of the present disclosure is not limited thereto.

Since the scope of the present disclosure is defined by the appended claims rather than the descriptions of the description so that the present disclosure can be implemented in various forms without departing from the scope of the essential features thereof, the exemplary embodiments and modifications are examples and not limited. All changes and equivalents of the claims and the scope thereof are intended to be included in the claims.

The invention claimed is:

1. A quadrupedal walking robot comprising:

a main body including a seat portion on which a person is to sit astride;

a handle to be gripped by the person seated on the seat portion;

four leg portions coupled to the main body and configured to perform a bending operation, each of the four leg portions including two or more joints;

a plurality of actuators configured to drive the plurality of joints;

an operation device disposed on the handle and configured to receive an input of a command related to an operation of the quadrupedal walking robot; and a controller configured to control the plurality of actuators in accordance with the command received from the operation device, wherein the main body includes a second portion located in a front direction with respect to the seat portion in the main body and higher than the seat portion in an up direction of the main body.

2. The quadrupedal walking robot according to claim 1, wherein the main body includes a first recessed portion recessed to receive a leg of the person seated on the seat portion at a portion located in a first lateral direction in the main body and located in a down direction with respect to the seat portion in the main body, and a second recessed portion recessed to receive a leg of the person seated on the seat portion at a portion located in a second lateral direction in the main body and located in a down direction with respect to the seat portion in the main body, and the first lateral direction and the second lateral direction of the main body are opposite directions and are directions intersecting front and back directions and up and down directions of the main body.

3. The quadrupedal walking robot according to claim 1, wherein the seat portion includes a seat surface on which the person is to be seated astride, and a first portion located in a back direction with respect to the seat surface in the main body and higher than the seat surface in the up direction of the main body.

4. The quadrupedal walking robot according to claim 1, wherein the second portion protrudes in a first lateral direction and a second lateral direction of the main body with respect to a third portion located in a down direction with respect to the seat portion in the main body, and the first lateral direction and the second lateral direction of the main body are opposite directions and are directions intersecting front and back directions and the up and down directions of the main body.

5. The quadrupedal walking robot according to claim 1, wherein the handle includes a bar to be gripped by the person seated on the seat portion, and the operation device includes either or both of a joystick and a key disposed on the bar.

6. The quadrupedal walking robot according to claim 1, further comprising a footrest which is disposed in a state of hanging down from the main body and on which the person seated on the seat portion is to put his/her feet.

7. The quadrupedal walking robot according to claim 1, further comprising:

a sensor configured to scan a periphery of the quadrupedal walking robot, wherein the controller is configured to process a signal received from the sensor and configured to detect either or both of an object around the quadrupedal walking robot and a position of the object.

8. The quadrupedal walking robot according to claim 7, wherein the sensor includes a camera, and the controller is configured to process an image signal received from the camera and configured to detect either or both of the object around the quadrupedal walking robot and the position of the object.

9. The quadrupedal walking robot according to claim 7, wherein the controller is configured to receive a command of a task to be executed by the quadrupedal walking robot, and control the plurality of actuators so as to cause the quadrupedal walking robot to autonomously travel in accordance with a predetermined program for executing the task, based on a processing result of the signal received from the sensor.

10. The quadrupedal walking robot according to claim 7, wherein the controller is configured to communicate, via wireless communication, with a wireless operation device configured to receive an input of a command related to an operation of the quadrupedal walking robot, and the controller is configured to control operations of the plurality of actuators in accordance with the command received from the wireless operation device, and transmit a processing result of the signal received from the sensor to the wireless operation device.

11. The quadrupedal walking robot according to claim 1, wherein each of the four leg portions includes a proximal joint coupled to the main body and one or more intermediate joints disposed between the proximal joint and a tip of the leg portion, the proximal joint is configured to operate with two or more degrees of freedom, and the intermediate joint is configured to operate with one or more degrees of freedom.

12. The quadrupedal walking robot according to claim 11, wherein each of the proximal joints of the four leg portions includes a first bent portion configured to be bent about a second axis extending in a direction intersecting a first axis extending in up and down directions in the main body, and a second bent portion configured to be bent about a third axis extending in a direction intersecting the first axis and the second axis, and the one or more intermediate joints of each of the four leg portions include a third bent portion configured to be bent to change an angle formed by portions on both sides of the intermediate joint in the leg portion.

13. The quadrupedal walking robot according to claim 1, wherein in each of the four leg portions, the one or more joints between the joint coupled to the main body and a tip of the leg portion include a first wheel which is rotatable, and the first wheel is configured to come into contact with a support surface supporting the quadrupedal walking robot as the joint operates, thereby supporting the quadrupedal walking robot.

14. The quadrupedal walking robot according to claim 13, wherein the first wheel is configured to change a traveling direction of the first wheel by moving together with the leg portion operated by the joint in a state of being in contact with the support surface.

15. The quadrupedal walking robot according to claim 13, wherein each of the four leg portions further includes a stopper configured to inhibit an operation of the one or more joints, the controller is configured to control the plurality of actuators so as to operate the four leg portions in a state where the stopper inhibits the operation of the one or more joints and the first wheel is in contact with the support surface in a predetermined case, and the predetermined case includes either or both of a case where the quadrupedal walking robot is suspended and a case where a person gets on and off the quadrupedal walking robot.

16. The quadrupedal walking robot according to claim 15, wherein each of the four leg portions includes, as the stopper, a first stopper configured to inhibit an operation of the joint coupled to the main body, and the controller is configured to control the plurality of actuators to operate the four leg portions in a state where the first stopper inhibits the operation of the joint and the first wheel is in contact with the support surface in the predetermined case.

17. The quadrupedal walking robot according to claim 15, wherein each of the four leg portions includes, as the stopper, a second stopper configured to inhibit an operation of the joint on which the first wheel is disposed, and the controller is configured to control the plurality of actuators to operate the four leg portions in a state where the second stopper inhibits the operation of the joint and the first wheel is in contact with the support surface in the predetermined case.

18. The quadrupedal walking robot according to claim 17, wherein each of the four leg portions further includes a second wheel, which is rotatable, between the tip of the leg portion and the joint on which the first wheel is disposed, and the second wheel comes into contact with the support surface in the state where the second stopper inhibits the operation of the joint and the first wheel is in contact with the support surface.

19. A quadrupedal walking robot comprising:

a main body including a seat portion on which a person is to sit astride;

a handle to be gripped by the person seated on the seat portion;

four leg portions coupled to the main body and configured to perform a bending operation, each of the four leg portions including two or more joints;

a plurality of actuators configured to drive the plurality of joints;

an operation device disposed on the handle and configured to receive an input of a command related to an operation of the quadrupedal walking robot; and a controller configured to control the plurality of actuators in accordance with the command received from the operation device, wherein the handle includes a bar to be gripped by the person seated on the seat portion, and the operation device includes either or both of a joystick and a key disposed on the bar.

20. A quadrupedal walking robot comprising:

a main body including a seat portion on which a person is to sit astride;

a handle to be gripped by the person seated on the seat portion;

four leg portions coupled to the main body and configured to perform a bending operation, each of the four leg portions including two or more joints;

a plurality of actuators configured to drive the plurality of joints;

an operation device disposed on the handle and configured to receive an input of a command related to an operation of the quadrupedal walking robot; and a controller configured to control the plurality of actuators in accordance with the command received from the operation device, wherein each of the four leg portions includes a proximal joint coupled to the main body and one or more intermediate joints disposed between the proximal joint and a tip of the leg portion, the proximal joint is configured to operate with two or more degrees of freedom, the intermediate joint is configured to operate with one or more degrees of freedom, each of the proximal joints of the four leg portions includes a first bent portion configured to be bent about a second axis extending in a direction intersecting a first axis extending in up and down directions in the main body, and a second bent portion configured to be bent about a third axis extending in a direction intersecting the first axis and the second axis, and the one or more intermediate joints of each of the four leg portions include a third bent portion configured to be bent to change an angle formed by portions on both sides of the intermediate joint in the leg portion.

21. A quadrupedal walking robot comprising:

a main body including a seat portion on which a person is to sit astride;

a handle to be gripped by the person seated on the seat portion;

four leg portions coupled to the main body and configured to perform a bending operation, each of the four leg portions including two or more joints;

a plurality of actuators configured to drive the plurality of joints;

an operation device disposed on the handle and configured to receive an input of a command related to an operation of the quadrupedal walking robot; and a controller configured to control the plurality of actuators in accordance with the command received from the operation device, wherein in each of the four leg portions, the one or more joints between the joint coupled to the main body and a tip of the leg portion include a first wheel which is rotatable, and the first wheel is configured to come into contact with a support surface supporting the quadrupedal walking robot as the joint operates, thereby supporting the quadrupedal walking robot.

* * * * *